US012674533B1

(12) United States Patent
Fields et al.

(10) Patent No.: US 12,674,533 B1
(45) Date of Patent: Jul. 7, 2026

(54) CONNECTOR ASSEMBLIES AND PROCESSES FOR USING SAME

(71) Applicant: KOIL ENERGY SOLUTIONS, INC., Houston, TX (US)

(72) Inventors: Michael Shane Fields, Conroe, TX (US); Leslie Edward Griffin, Jr., Cypress, TX (US); Jacob Lynn LeNoir, Spring, TX (US)

(73) Assignee: KOIL ENERGY SOLUTIONS, INC., Houston, TX (US)

( * ) Notice: Subject to any disclaimer, the term of this patent is extended or adjusted under 35 U.S.C. 154(b) by 0 days.

(21) Appl. No.: 19/367,988

(22) Filed: Oct. 24, 2025

Related U.S. Application Data

(60) Provisional application No. 63/741,939, filed on Jan. 5, 2025.

(51) Int. Cl.
*F16L 37/091* (2006.01)

(52) U.S. Cl.
CPC .............................. *F16L 37/0915* (2016.05)

(58) Field of Classification Search
CPC ... F16L 37/0915; F16L 37/138; F16L 37/122; F16L 37/1215; F16L 37/1235; F16L 37/62; F16L 37/08; F16L 37/56; F16L 23/00; F16L 23/004; F16L 25/06; E21B 41/0007; E21B 41/0014
See application file for complete search history.

(56) References Cited

U.S. PATENT DOCUMENTS

| | | | | | |
|---|---|---|---|---|---|
| 3,214,195 | A | * | 10/1965 | Zahuranec | F16L 37/23 285/27 |
| 3,486,556 | A | * | 12/1969 | Burgess | E21B 33/0387 285/120.1 |
| 3,701,549 | A | * | 10/1972 | Koomey | F16L 37/002 285/379 |
| 3,863,961 | A | * | 2/1975 | Dinning | E21B 23/01 403/322.2 |
| 6,554,324 | B1 | * | 4/2003 | Herman | F16L 37/002 285/900 |
| 10,519,620 | B2 | * | 12/2019 | Friedrich | E02F 3/3609 |
| 2014/0112699 | A1 | * | 4/2014 | Lewkoski | F16L 39/04 403/33 |
| 2018/0172157 | A1 | * | 6/2018 | Eide | B25B 13/48 |
| 2020/0240559 | A1 | * | 7/2020 | Lucchese | F16L 1/26 |
| 2020/0408344 | A1 | * | 12/2020 | Nick | F16L 37/56 |

* cited by examiner

*Primary Examiner* — Aaron M Dunwoody
(74) *Attorney, Agent, or Firm* — Edmonds & Cmaidalka, P.C.

(57) ABSTRACT

Connector assemblies and processes for using same. The connector assembly can include a first connector part having a first coupler plate and a collet housing and a second connector part having a second coupler plate, a housing, a collet, a mandrel retainer, a mandrel, and a drive nut. The collet can include a plurality of fingers disposed toward a first end of the collet and a second end of the mandrel can be coupled to the drive nut. A shoulder of each finger of the collet can be aligned with an inner groove defined by the collet housing. When the drive nut is rotated, a first surface disposed on a first end of the mandrel can radially displace the fingers such that each shoulder can be least partially disposed within the inner groove defined by the collet housing to connect the first and second connector parts to one another.

20 Claims, 8 Drawing Sheets

CONNECTOR ASSEMBLIES AND PROCESSES FOR USING SAME

CROSS-REFERENCE TO RELATED APPLICATION

This application claims priority to U.S. Provisional Patent Application No. 63/741,939, filed on Jan. 5, 2025, which is incorporated by reference herein.

FIELD

Embodiments described generally relate to connector assemblies and processes for using same. More particularly, such embodiments relate to connector assemblies configured to connect a plurality of conduits to one another and processes for using same.

BACKGROUND

In the oil and gas industry, and, in particular the offshore and subsea sectors, connector assemblies and processes exist to simultaneously connect a first plurality of conduits to a corresponding second plurality of conduits that can be disposed on a subsea structure. The first plurality of conduits is often grouped together into an elongated bundle referred to as a flying lead or an umbilical. Each conduit in the first plurality of first conduits can include a fluid coupler first part and each fluid conduit in the second plurality of conduits can include a fluid coupler second part. Each fluid coupler first part is connectable to a corresponding fluid coupler second part. The first connector part that can be disposed on the subsea structure that can include a plurality of fluid coupler first parts and a second connector part that can be disposed on an end of the flying lead or umbilical, sometimes referred to as an end termination or a cobra head that can include a corresponding plurality of fluid coupler second parts. As an example, an end termination of the flying lead or umbilical can be connected to a subsea Christmas tree using a connector assembly, where the first connector part is disposed on the Christmas tree and the second connector part is disposed on the end of the flying lead or umbilical. Such connections are typically made with remotely operated vehicles.

These connector assemblies are typically designed to resist forces acting on the connector assembly. The forces can notably include a combined axial force resulting from an internal pressure of a fluid contained within each of the first plurality of conduits and the second plurality of conduits that push the first connector part and second connector part of the connector assembly away from one another. As offshore oil and gas explorations advance, higher pressure reservoirs are being encountered that require internal design pressures within the plurality of conduits that exceed the capacity of currently available connector assemblies.

There is a need, therefore, for improved connector assemblies and process for using same.

SUMMARY

Connector assemblies and processes for using same are provided. In some embodiments a connector assembly can include a first connector and a second connector part. The first connector part can include a first coupler plate having a first side and a second side. The first coupler plate can define a plurality of first coupler bores therethrough. Each first coupler bore can be configured to receive a coupler first part. The first connector part can include a collet housing that can extend from the second side of the first coupler plate and that can define a bore having an inner surface at least partially therethrough and an inner groove about at least a portion of the inner surface of the bore. The second connector part can include a second coupler plate having a first side and a second side. The second coupler plate can define a plurality of second coupler bores and a collet housing receiving bore therethrough. Each second coupler bore can be configured to receive a coupler second part. The second connector part can include a housing that can have a first end and a second end. The housing can define a bore therethrough. The first end of the housing can be configured to be secured to the second side of the second coupler plate. The second connector can include a mandrel retainer. The second connector part can include mandrel having a first end and a second end. The mandrel can define a first surface toward the first end of thereof that can extend radially outward from a least a portion of the mandrel. The second connector part can include a collet having a first end and a second end. A plurality of fingers can be disposed toward or at the first end of the collet. The collet can define a bore therethrough. The mandrel can be at least partially disposed within the bore defined by the collet. Each finger can include a shoulder disposed on an external surface thereof, and the shoulder of each finger can be configured to be at least partially disposed within the inner groove defined by the collet housing. The second connector part can include a drive nut comprising a first end and a second end at least partially disposed within the housing, The mandrel can be movable relative to the collet along a longitudinal axis of the connector assembly. The mandrel can be rotationally restrained about the longitudinal axis of the connector assembly by the mandrel retainer. The second end of the mandrel can be coupled to the first end of the drive nut. At least a portion of the mandrel, the collet, the mandrel retainer, and at least a portion of the drive nut can be disposed within the bore defined by the housing. The first connector part and the second connector part can be connected to one another when the first surface of the mandrel is at least partially disposed within the bore defined by the collet and the shoulder of each finger is at least partially disposed within the inner groove defined by the collet housing.

A process for connecting a first connector part and a second connector part of a connector assembly to one another can include obtaining the connector assembly. The first connector part can include a first coupler plate that can include a first side and a second side. The first coupler plate can define a plurality of first coupler bores therethrough. Each first coupler bore can be configured to receive a coupler first part. A collet housing can extend from the second side of the first coupler plate and can define a bore having an inner surface at least partially therethrough and an inner groove about at least a portion of the inner surface of the bore. The second connector part can include a second coupler plate having a first side and a second side. The second coupler plate can define a plurality of second coupler bores and a collet housing receiving bore therethrough. Each second coupler bore can be configured to receive a coupler second part. The second connector part can include a housing that can have a first end and a second end. The housing can define a bore therethrough, the first end of the housing can be secured to the second side of the second coupler plate, and the housing can include a mandrel retainer. The second connector part can include a mandrel having a first end, a second end, and that can define a first surface toward the first end thereof that extends radially outward from at least a portion of the mandrel. The second connector part can include a collet having a first end and a second end. A plurality of fingers can be disposed toward or at the first end of the collet, the collet can define a bore therethrough, the mandrel can be at least partially disposed within the bore defined by the collet, each finger can include a shoulder disposed on an external surface thereof, and the shoulder of each finger can be configured to be at least partially disposed within the inner groove defined by the collet housing. The second connector part can include a drive nut that can include a first end and a second end at least partially disposed within the housing. The mandrel can be movable relative to the collet along a longitudinal axis of the connector assembly. The mandrel can be rotationally restrained about the longitudinal axis of the connector assembly by the mandrel retainer. The second end of the mandrel can be coupled to the first end of the drive nut. At least a portion of the mandrel, the collet, the mandrel retainer, and at least a portion of the drive nut can be disposed within the bore defined by the housing. The process can include positioning the first connector part and the second connector part at a connectable position with respect to one another and radially displacing the plurality of fingers to position the shoulder of each finger at least partially within the inner groove defined by the collet housing.

A process for disconnecting a first connector part and a second connector part of a connector assembly from one another can include obtaining an override tool and the connector assembly. The first connector part can include a first coupler plate having a first side and a second side. The first coupler plate can define a plurality of first coupler bores therethrough. Each first coupler bore can be configured to receive a coupler first part. The first connector part can include a collet housing that can extend from the second side of the first coupler plate and that can define a bore having an inner surface at least partially therethrough and an inner groove about at least a portion of the inner surface of the bore. The second connector part can include a second coupler plate having a first side and a second side. The second coupler plate can define a plurality of second coupler bores and a collet housing receiving bore therethrough. Each second coupler bore can be configured to receive a coupler second part. The second connector part can include a housing having a first end and a second end. The housing can define a bore therethrough. The first end of the housing can be secured to the second side of the second coupler plate. The second connector part can include a mandrel retainer. The second connector part can include a mandrel that can include a first mandrel part and a second mandrel part. A first end of the second mandrel part can be threadingly connected to a second end of the first mandrel part. The second mandrel part defines a bore therethrough. The first mandrel part can defines a first surface toward a first end thereof that extends radially outward from at least a portion of the first mandrel part. The second end of the first mandrel part defines a bore at least partially therethrough that can be configured to receive an override tool through the bore defined by the second mandrel part. The second connector part can include a collet having a first end and a second end. A plurality of fingers can be disposed toward or at the first end of the collet. The collet can define a bore therethrough. The mandrel can be at least partially disposed within the bore defined by the collet. Each finger can include a shoulder disposed on an external surface thereof. The shoulder of each finger can be at least partially disposed within the inner groove defined by the collet housing. The second connector part can include a drive nut that can include a first end and a second end at least partially disposed within the housing. The drive nut can define a bore therethrough. The mandrel can be movable relative to the collet along a longitudinal axis of the connector assembly. The mandrel can be rotationally restrained about the longitudinal axis of the connector assembly by the mandrel retainer. A second end of the second mandrel part can be threadingly coupled to the first end of the drive nut, and at least a portion of the mandrel, the collet, the mandrel retainer and at least a portion of the drive nut can be disposed within the bore defined by the housing. The process can include inserting an end of the override tool through the bore defined by the drive nut, the bore defined by the second mandrel part, and into the bore defined by the second end of the first mandrel part. The process can include rotating the first mandrel part relative to the second mandrel part by rotating the override tool to disconnect the first connector part from the second connector part.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
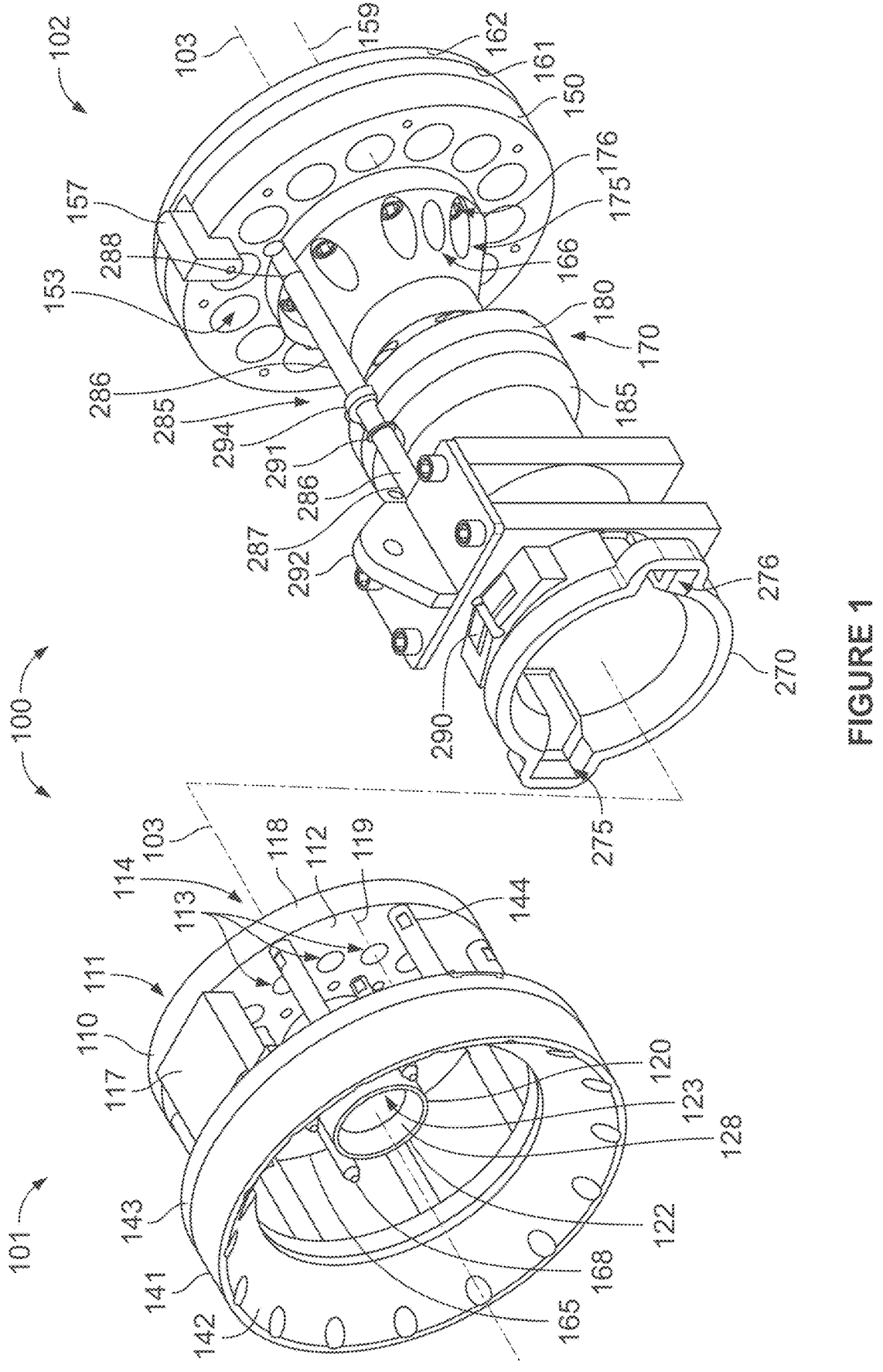
FIG. 1 depicts a perspective view of an illustrative first connector part and a second connector part of an illustrative connector assembly, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

The term "substantially aligned" means that an axis of a first body is within +/−15 degrees, +/−10 degrees, within +/−5 degrees, or +/−2 degrees of being colinear with an axis of a second body.

The term "substantially parallel" means that an axis of a first body is within +/−15 degrees, +/−10 degrees, within +/−5 degrees, or +/−2 degrees of being parallel to an axis of a second body.

If the first body is said to not substantially rotate relative to a second body, then the first body can rotate +/−15 degrees, or +/−10 degrees, or +/−5 degrees, +/−2 degrees, +/−1 degree, or less relative to the second body.

Figure 2:
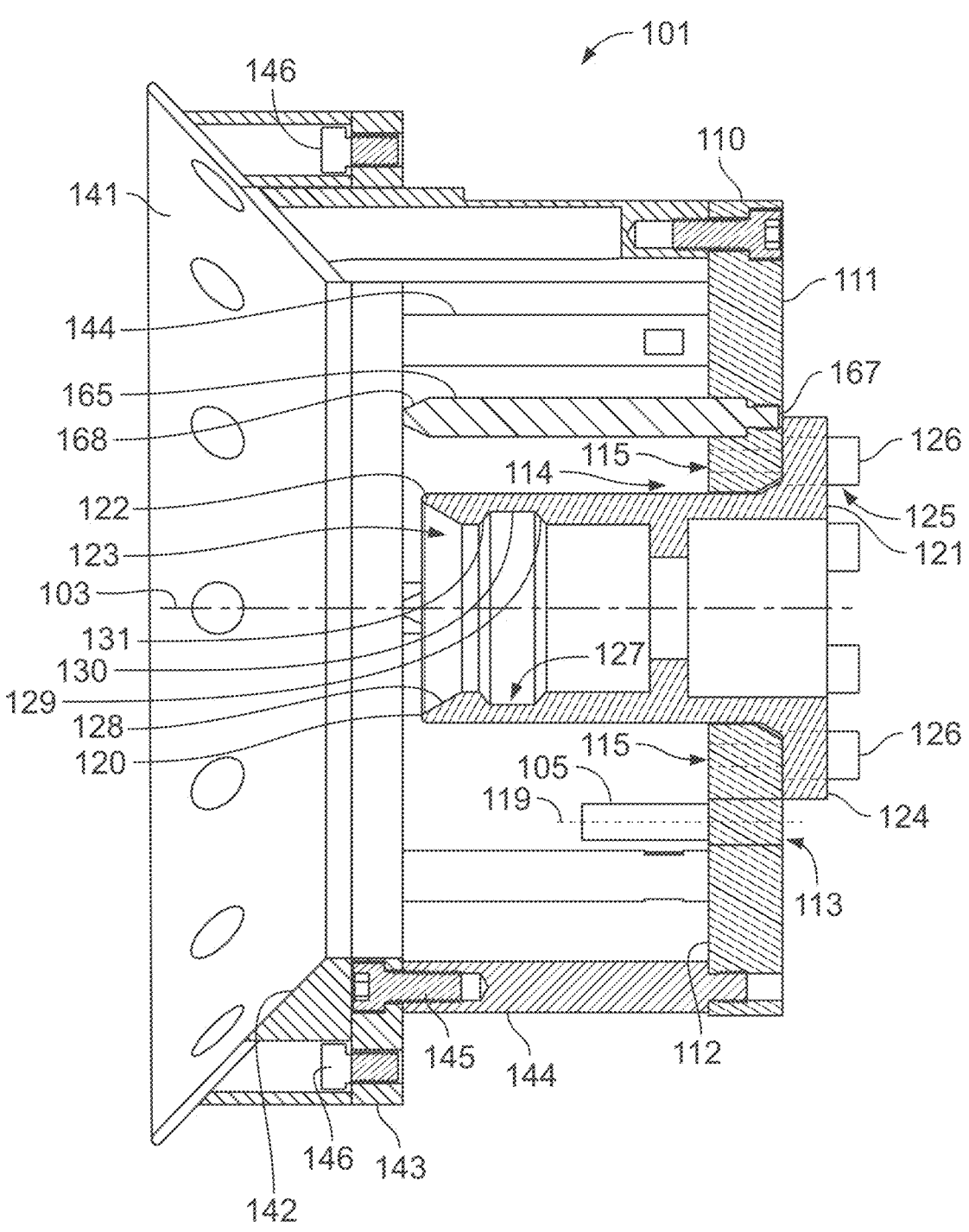
FIG. 2 depicts a cross-sectional view of the first connector part shown in FIG. 1.
Figure 3:
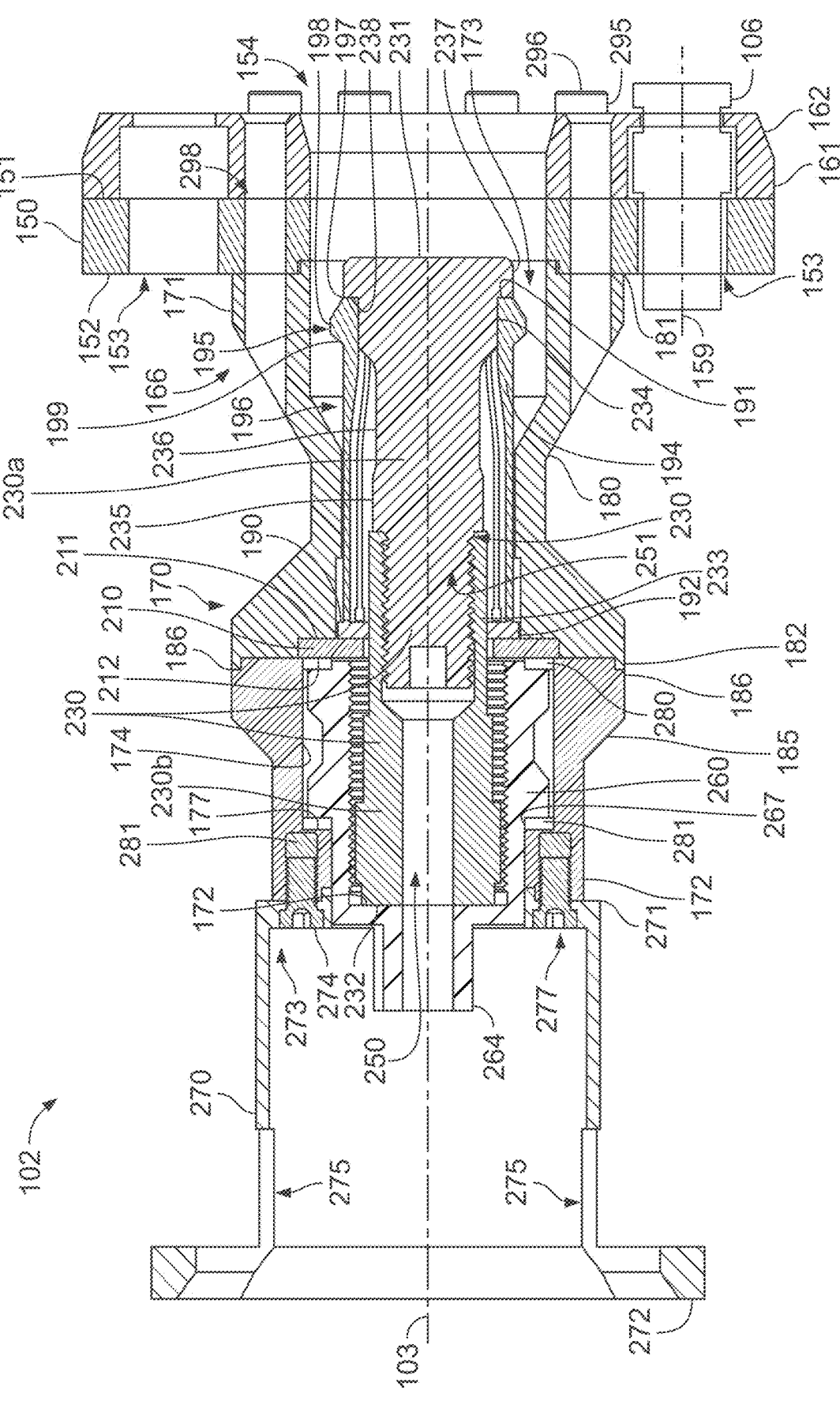
FIG. 3 depicts a cross-sectional view of the second connector part shown in FIG. 1.
Figure 4:
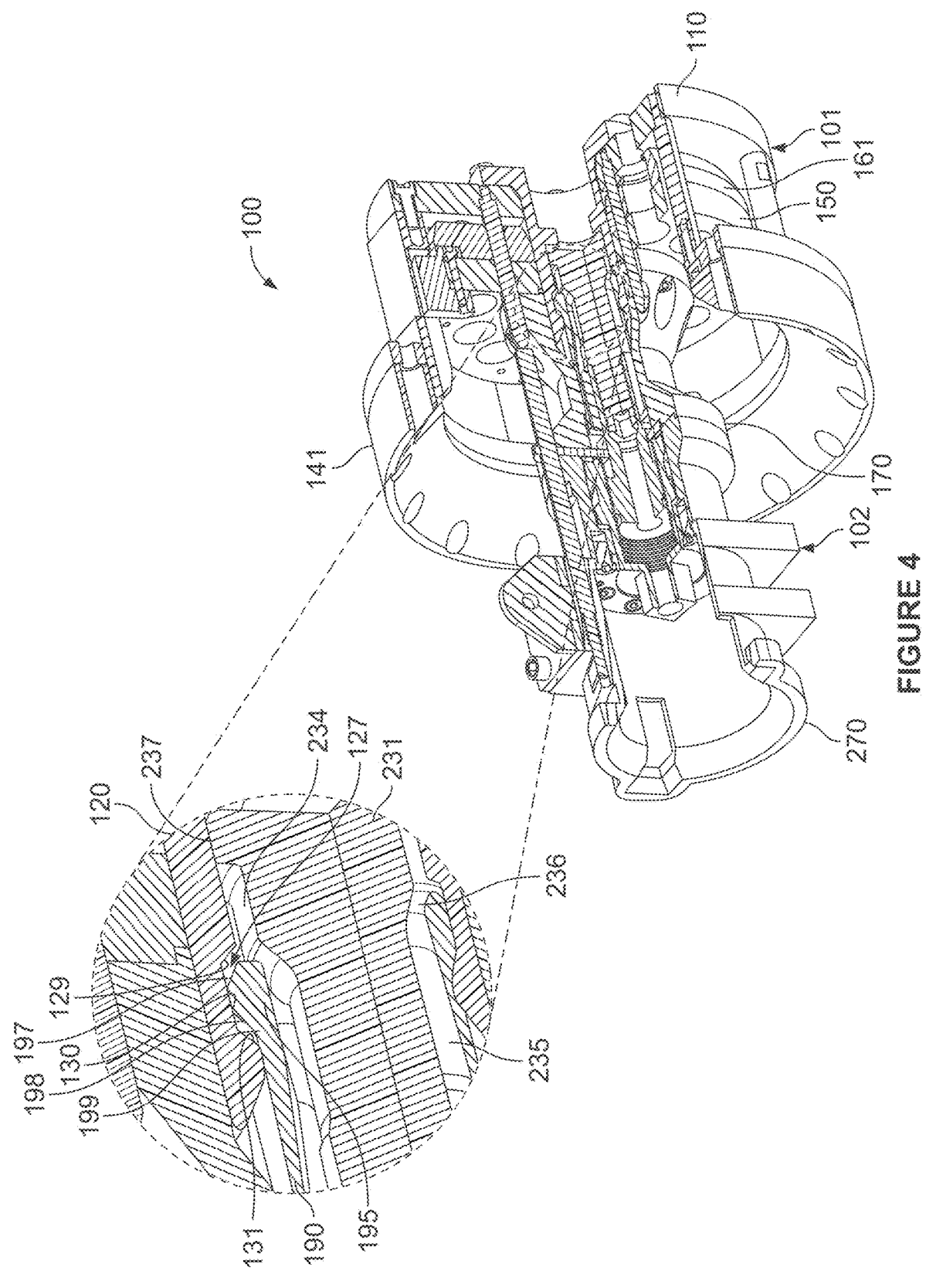
FIG. 4 depicts a three-quarter perspective view of the first connector part and the second connector part shown in FIG. 1 in a connectable position with respect to one another.
Figure 5:
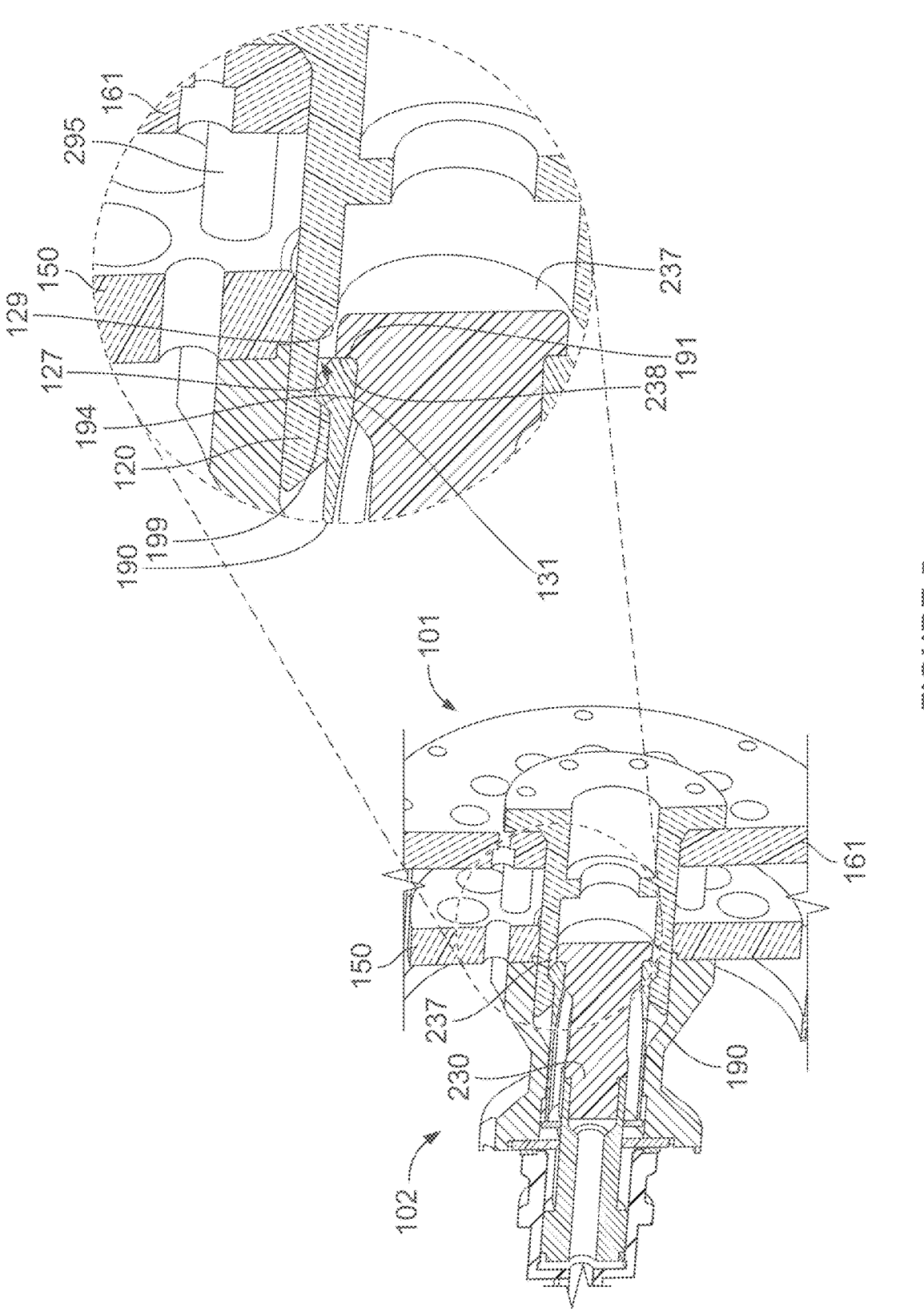
FIG. 5 depicts a cut-away perspective partial view of the first connector part and the second connector part shown in FIG. 1, in a connected configuration that excludes an optional alignment guide on the second connector part for clarity.
Figure 6:
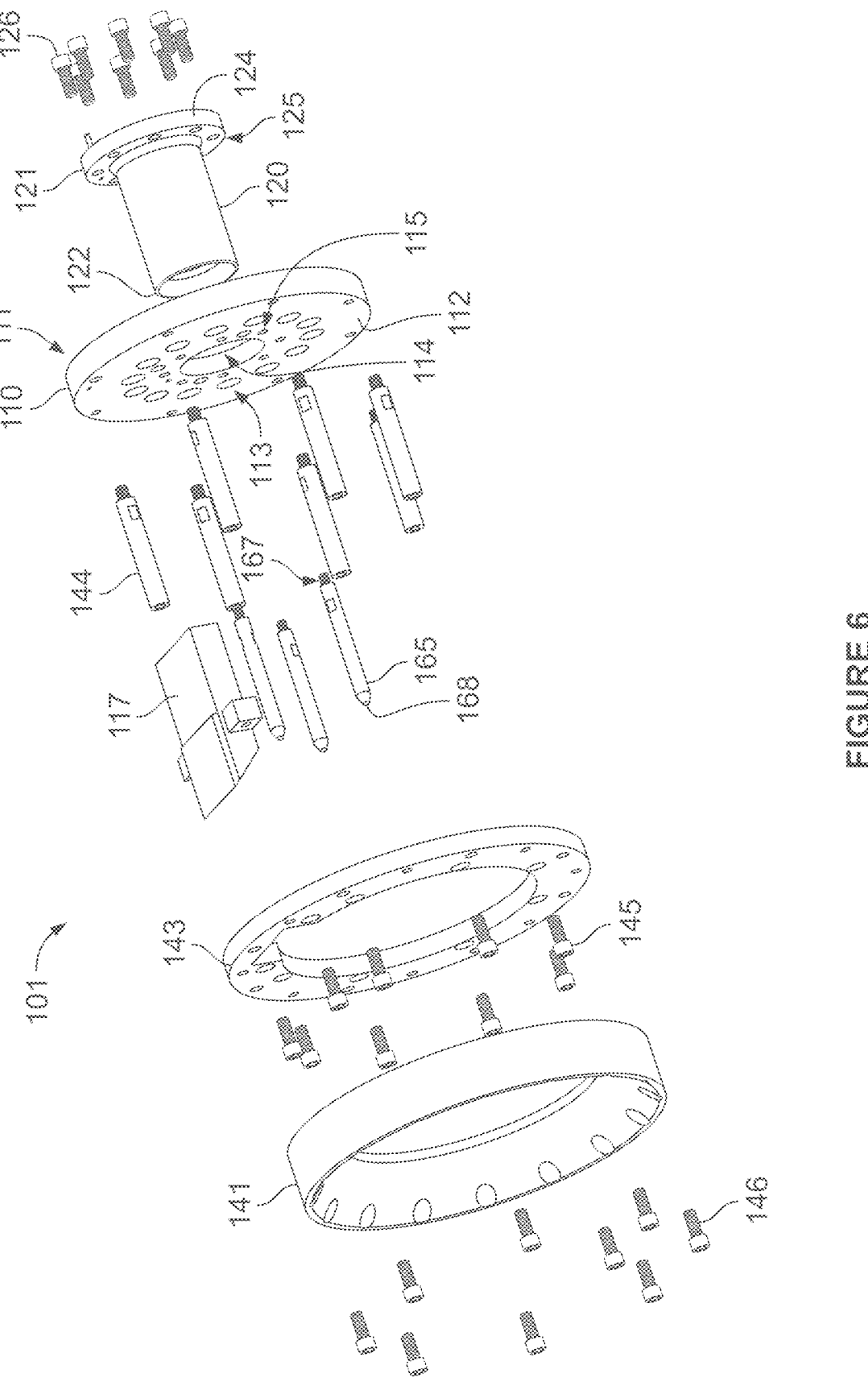
FIG. 6 depicts an exploded perspective view of the first connector part shown in FIG. 1.
Figure 7:
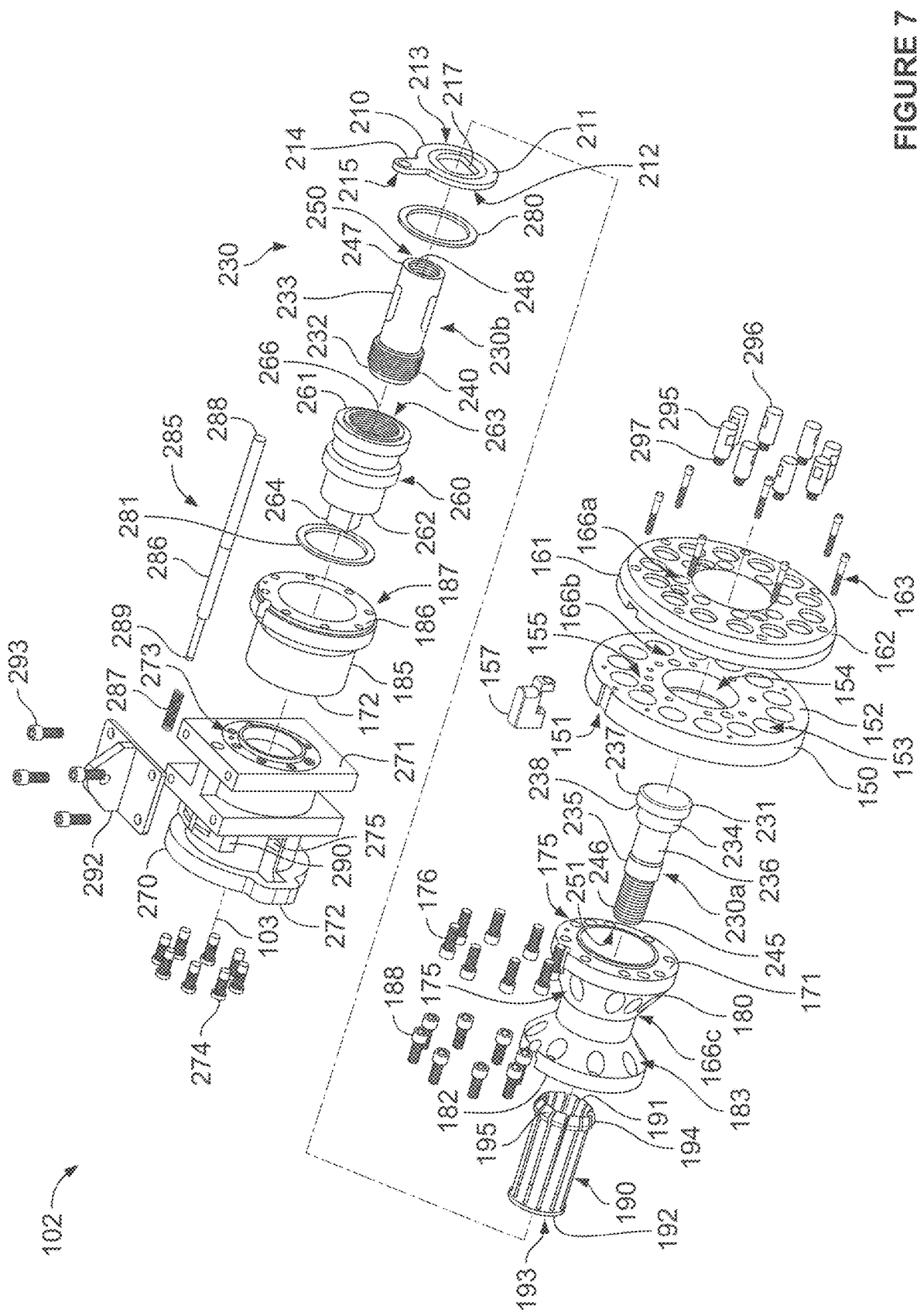
FIG. 7 depicts an exploded perspective view of the second connector part shown in FIG. 1.

FIG. 1 depicts a perspective view of a first connector part 101 and a second connector part 102 of a connector assembly 100, according to one or more embodiments. FIG. 2 depicts a cross-sectional view of the first connector part 101 shown in FIG. 1 and FIG. 3 depicts a cross-sectional view of the second connector part 102 shown in FIG. 1. FIG. 4 depicts a three-quarter perspective view of the connector assembly 100 with the first connector part 101 and the second connector part 102 shown in FIG. 1 in a connectable position with respect to one another. FIG. 5 depicts a cut-away perspective partial view of the first connector part 101 and the second connector part 102 shown in FIG. 1 in a connected configuration that excludes an optional alignment guide disposed on the second connector part 102 for clarity. FIGS. 6 and 7 depict an exploded perspective view of the first connector part 101 and the second connector part 102 respectively.

Referring to FIGS. 1, 2, and 6 collectively, in some embodiments, the first connector part 101 can include a coupler plate or "first coupler plate" 110 and a collet housing 120. In some embodiments, the first coupler plate 110 can include a first side 111 and a second side 112 and can define a plurality of coupler bores or "first coupler bores" 113 therethrough. Referring to FIGS. 1, 3, 4 and 7 collectively, in some embodiments, the second connector part 102 can include a coupler plate or "second coupler plate" 150, a housing 170, the collet 190, a mandrel retainer 210, the mandrel 230, and a drive nut 260.

In some embodiments, the first coupler plate 110 can include one or more coupler first parts 105 each disposed at least partially within a corresponding one of the one or more of the first coupler bores 113 defined by the first coupler plate 110. In some embodiments, the second coupler plate 150 can include one or more coupler second parts 106 each disposed at least partially within a corresponding one of the one of the second coupler bores 153. In some embodiments, the one or more coupler first parts 105 and the one or more coupler second parts 106, when coupled to one another, can independently be configured to provide a fluid connection, an electrical connection, and/or an optical connection. As such, in some embodiments, the one or more coupler first parts 105 and the one or more coupler second parts 106 can independently be configured to connect fluid conduits, electrical cables, and/or fiber optic cables. For simplicity and ease of description, the one or more coupler first parts 105 and the one or more coupler second parts 106 will be described as being a fluid coupler first part 105 and a fluid coupler second part 106.

Continuing with reference to FIGS. 1, 2, and 6 collectively, in some embodiments, one fluid coupler first part 105 can be disposed at least partially within one of the first coupler bores 113 defined by the first coupler plate 110. In other embodiments, at least one fluid coupler first part 105 can be disposed at least partially within at least one and less than all of the first coupler bores 113 defined by the first coupler plate 110. In still other embodiments, one fluid coupler first part 105 can be disposed at least partially within each of the first coupler bores 113 defined by the first coupler plate 110. The number of fluid coupler first parts 105 and the number of first coupler bores 113 defined by the first coupler plate 110 can be based, at least in part, on the particular configuration of the system in which the connector assembly 100 will be utilized.

In some embodiments, the fluid coupler first part 105 can extend from the second side 112 of the first coupler plate 110 and away from the first side 111 of the first coupler plate 110. In some embodiments, each fluid coupler first part 105 can be in fluid communication with a fluid conduit (not shown) that can extend to a subsea structure, for example a subsea Christmas tree, a subsea control distribution unit, a subsea manifold, or any other subsea structure, not shown. In some embodiments, the first connector part 101 can be disposed on the subsea structure. In other embodiments, the first connector part 101 can be disposed on an ancillary structure that can be disposed on the subsea structure. In still other embodiments, the first connector part 101 can be disposed on an ancillary structure that can be located in close proximity to the subsea structure. In some embodiments, the first coupler plate 110 can be formed from a metallic material such as steel, a steel alloy, or any other suitable material.

In some embodiments, the collet housing 120 can have a first end 121 and a second end 122. The second end 122 of the collet housing 120 can define a bore 123 at least partially therethrough. In some embodiments, the first end 121 of the collet housing 120 can be attached to or disposed on the second side 112 of the first coupler plate 110 such that the bore 123 can be aligned along a longitudinal axis 103 of the connector assembly 100. In some embodiments, the longitudinal axis 103 can be a central longitudinal axis of the connector assembly 100. In some embodiments, as shown, the first end 121 of the collet housing 120 can include a flange 124 and the first coupler plate 110 can define a collet receiving bore 114 therethrough. In some embodiments, the collet receiving bore 114 of the first coupler plate 110 can be aligned along a longitudinal axis 103 of the connector assembly. The collet housing 120 can be at least partially disposed within or through the collet receiving bore 114 defined by the first coupler plate 110 such that the flange 124 abuts against the first side 111 of the first coupler plate 110. In some embodiments, the flange 124 can define a plurality of fastener bores 125 and the first coupler plate 110 can define a plurality of corresponding threaded fastener bores 115. The flange 124 can be disposed within the collet receiving bore 114 defined by the first coupler plate 110 such that the flange 124 abuts the first side 111 of the first coupler plate 110 and can be secured to the first coupler plate 110 via a plurality of fasteners 126 that can be disposed through the plurality of fastener bores 125 defined by the flange 124 and threaded into the plurality of corresponding threaded fastener bores 115 defined by the first coupler plate 110. In other embodiments, not shown, the plurality of fastener bores 125 defined by the flange 124 can each have a threaded inner surface and the collet housing 120 can be secured to the first coupler plate 110 via the plurality of fasteners 126 that can be disposed through the plurality of fastener bores 115 defined by the first coupler plate 110 and threaded into the plurality of fastener bores 125 defined by the flange 124. In other embodiments, not shown, the collet housing 120 and the first coupler plate 110 can be secured to one another via welding. In such embodiments, the collet housing 120 can be free of the flange 124 and the first coupler plate 110 can be free of the collet receiving bore 114 therethrough. In still other embodiments, the collet housing 120 and the first coupler plate 110 can be formed from a single piece of material, for example a single piece of steel. In such embodiments, the collet housing 120 can be free of the flange 124 and the first coupler plate 110 can be free of the collet receiving bore 114 therethrough.

In some embodiments, the plurality of first coupler bores 113 can be disposed about the first coupler plate 110, e.g., about the longitudinal axis 103 of the connector assembly 100. In some embodiments the coupler bores 113 can be arranged in any pattern about the first coupler plate 110. In some embodiments, a distance between the collet housing 120 and each of the plurality of coupler bores 113 can be the same or different with respect to one another. In some embodiments, a distance between the collet housing 120 and at least one of the coupler bores 151 can have a first length and a distance between the collet housing 120 and at least one of the coupler bores 113 can have a second length, where the first and second lengths can be different. In some embodiments, when the collet housing 120 is a separate component from the first coupler plate 110, the collet housing 120 can be formed, manufactured, or machined from a metallic material such as steel, a steel alloy, or any other suitable material.

In some embodiments, the collet housing 120 can define an inner groove 127 at least partially about an internal surface 130 thereof. In some embodiments, the inner groove 127 can be a continuous groove about the internal surface 130 of the collet housing 120 as shown, or a plurality of partial grooves about the internal surface 130 of the collet housing 120, not shown. In some embodiments, the collet housing 120 can include a first shoulder 129 and a second shoulder 131 that together with the internal surface 130 of the collet housing 120 can define the inner groove 127 of the collet housing 120. In some embodiments, the first shoulder 129 of the collet housing 120 can be a frusto-conical surface that can be angled away from the internal surface 130 and the second shoulder 131 of the collet housing 120 can be a frusto-conical surface that can be angled away from the internal surface 130 with respect to the longitudinal axis 103 of the connector assembly 100. In some embodiments, the first shoulder 129 and the second shoulder 131 can independently be at an angle oriented away from the internal surface 130 of about 10°, about 20 degrees, about 30 degrees, or about 40 degrees to about 45 degrees, about 50 degrees, about 55 degrees, about 60 degrees, or about 70 degrees, with respect to the longitudinal axis 103 of the connector assembly 100.

In some embodiments, the collet housing 120 can include an internal guide surface 128 located at the second end 122 of the collet housing 120. In some embodiments, the internal guide surface 128 can be a frusto-conical surface. The internal guide surface 128 can be configured to guide or otherwise direct a first end 231 of a mandrel 230 and a first end 191 of a collet 190 disposed about the mandrel 230 in the second connector part 102 (described in more detail below with regard to FIGS. 3 and 7) into the collet housing 120 such that the first connector part 101 and the second connector part 102 can be in a connectable position with respect to one another.

In some embodiments, the first connector part 101 can include an optional alignment guide 141 that can be disposed on the second side 112 of the first coupler plate 110. The alignment guide 141 can include or define an inner surface 142 that can define a gradually decreasing inner diameter. In some embodiments, the alignment guide 141 can include or define a frusto-conical inner surface 142. In some embodiments, the alignment guide 141 can be connected to or disposed on the second side 112 of the first coupler plate 110 via a plurality of legs 144 as shown in FIGS. 1, 2, and 7. In other embodiments, the alignment guide 141 can be directly connected to the second side 112 of the first coupler plate 110, not shown. In some embodiments, an adaptor plate 143 can be disposed between the first coupler plate 110 and the alignment guide 141 or between alignment guide 141 and the plurality of legs 144, as shown. In some embodiments, the adaptor plate 143 can be configured to facilitate mounting the alignment guide 141 to the plurality of legs 144. In some embodiments, the adaptor plate 143 can be connected to the plurality of legs 144 via a plurality of fasteners 145 and the alignment guide 141 can be connected to the adaptor plate 143 via a plurality of fasteners 146.

Referring to FIGS. 1, 3, 4 and 7 collectively, as noted above, in some embodiments, the second connector part 102 can include a coupler plate or "second coupler plate" 150, a housing 170, the collet 190, a mandrel retainer 210, the mandrel 230, and a drive nut 260. In some embodiments, the second connector part 102 can include a torque bucket 270. In some embodiments, the second coupler plate 150 can include a first side 151 and a second side 152 and can define a plurality of second coupler bores 153 therethrough. The second coupler plate 150 can also define a collet housing receiving bore 154 therethrough. In some embodiments, the collet housing receiving bore 154 can be a longitudinal bore aligned along the longitudinal axis 103 of the connector assembly 100 that can extend from the first side 151 to the second side 152 thereof.

In some embodiments, the plurality of second coupler bores 153 can be disposed about the collet housing receiving bore 154. In some embodiments, the plurality of second coupler bores 153 can be arranged in any pattern about the second coupler plate 150. In some embodiments, a distance between the collet housing receiving bore 154 and each of the second coupler bores 153 can be the same or different with respect to one another. In some embodiments, a distance between the collet housing receiving bore 154 and at least one of the second coupler bores 153 can have a first length and a distance between the collet housing receiving bore 154 and at least one of the second coupler bores 153 can have a second length, where the first and second lengths can be different. The second coupler bores 153 defined by the second coupler plate 150 can align with the coupler bores 113 defined by the first coupler plate 110 when the second coupler plate 150 and the first coupler plate 150 are correctly oriented with respect to one another.

In some embodiments, one fluid coupler second part 106 can be disposed at least partially within one of the second coupler bores 153 defined by the second coupler plate 150. In other embodiments, at least one fluid coupler second part 106 can be disposed at least partially within at least one and less than all of the second coupler bores 153 defined by the second coupler plate 150. In still other embodiments, one fluid coupler second part 106 can be disposed at least partially within each of the second coupler bores 153 defined by the second coupler plate 150. The number of fluid coupler second parts 106 and the number of second coupler bores 153 defined by the second coupler plate 150 can be based, at least in part, on the particular configuration of the system in which the connector assembly 100 will be utilized. In some embodiments, the number of second coupler bores 153 and the particular configuration of second coupler bores 153 that can include a fluid coupler second part 106 disposed at least partially therein can correspond to the number and particular configuration of the first coupler bores 113 that can include a fluid coupler first part 105 at least partially disposed therein.

The fluid coupler second part(s) 106 can extend from the second side 152 of the second coupler plate 150. Each fluid coupler second part 106 can be in fluid communication with a fluid conduit (not shown) that can lead away from the second side 152 of the second coupler plate 150, for example toward an umbilical or a flying lead. Each second coupler bore 153 can be configured to align with a corresponding first coupler bore 113 such that each fluid coupler first part 105 can be in a connected position relative to a corresponding fluid coupler second part 106 when the first connector part 101 and the second connector part 102 are in a connectable position relative to one another. In some embodiments, the second coupler plate 150 can be formed from a metallic material such as steel, a steel alloy, or any other suitable material.

In some embodiments, the housing 170 of the second connector part 102 can include a first end 171 and a second end 172 and can define a bore 173 therethrough. In some embodiments the bore 173 can be a longitudinal bore aligned along the longitudinal axis 103 that extends from the first end 171 to the second end 172 thereof. In some embodiments, the bore 173 can have a constant internal diameter. In other embodiments the bore 173 can have an internal diameter that varies along a length of the housing 170, as shown.

The first end 171 of the housing 170 can be configured to be secured to the second side 152 of the second coupler plate 150. In some embodiments, the housing 170 can define a plurality of fastener bores 175 and the second coupler plate 150 can define a plurality of threaded fastener bores 155 that correspond to the plurality of fastener bores 175. The housing 170 can be secured to the second coupler plate 150 via a plurality of fasteners 176 that can be disposed through the plurality of fastener bores 175 and threaded into the plurality of threaded fastener bores 155 defined by the second coupler plate 150. In other embodiments, not shown, the plurality of fastener bores 175 defined by the housing 170 can each have a threaded inner surface and the housing 170 can be secured to the second coupler plate 150 via the plurality of fasteners 176 that can be disposed through the plurality of fastener bores 175 defined by the second coupler plate 150 and threaded into the plurality of fastener bores defined by the housing 170. In other embodiments, the housing 170 and the second coupler plate 150 can be secured to one another via welding. In still other embodiments, the housing 170 and the second coupler plate 150 can be formed from a single piece of material, for example a single piece of steel.

In some embodiments, the second end 172 of the housing 170 can include a shoulder 177 disposed on an internal surface 174 of the housing 170. In such embodiments, the shoulder 177 can include a plurality of threaded bores 277 that can be configured to receive a plurality of fasteners 274 to secure a torque bucket 270 thereto, as described in more detail below.

In some embodiments, the housing 170 can include a first housing part 180 and a second housing part 185. The first housing part 180 can have an end 182 and the second housing part 185 can have an end 186. In some embodiments, the end 186 of the second housing part 185 can be connected to, e.g., bolted to, or otherwise secured to the end 182 of the first housing part 180 via a plurality of fasteners 188. In some embodiments, the end 186 of the second housing part 185 can define a plurality of threaded bores 187 and the end 182 of the first housing part 180 can define a plurality of corresponding bores 183 and end 182 of the first housing part 180 can be secured to the first end 186 of the second housing part 185 via a plurality of fasteners 188 that can be disposed through the plurality of corresponding bores 183 and threaded into the plurality of threaded bores 187. In other embodiments, not shown the second end 182 of the first housing part 180 can include the plurality of threaded bores 187 and the first end 186 of the first housing part 180 can include the plurality of corresponding bores 183. In some embodiments, the housing 170, the first housing part 180, and the second housing part 185 can each be formed, manufactured or machined from a metallic material such as steel, a steel alloy, or any other suitable material.

In some embodiments, the collet 190 can be disposed within the bore 173 of the housing 170. The collet 190 can have a first end 191, a second end 192, and can include a plurality of fingers 194. The collet 190 can define a longitudinal bore 193 therethrough. In some embodiments the plurality of fingers 194 can start or otherwise begin at a location between the second end 192 of the collet 190 and the first end 191 of the collet 190 and extend toward the first end 191 of the collet 190. For example, a portion of the collet 190 toward the second end 192 of the collet 190 can be a continuous sidewall and the fingers 194 can extend from an end of the continuous sidewall located between the second end 192 and the first end 191 of the collet.

One or more of the plurality of the fingers 194 can include a shoulder 195 disposed on an external surface 196 of the finger 194 toward or at the first end 191 of the collet 190. In some embodiments, the plurality of fingers 194 can deflect, e.g., expand or contract, in a radial direction, i.e., a direction that can be perpendicular or substantially perpendicular to the longitudinal axis 103 of the connector assembly 100, when subjected to a radial force. In some embodiments, each shoulder 195 can be configured to be at least partially disposed and secured within the inner groove 127 defined by the collet housing 120 when the fingers 194 are in an expanded configuration with respect to the longitudinal bore 193. In some embodiments, each shoulder 195 can include a first end 197, a surface 198, and a second end 199. In some embodiments, the first end 197 of each shoulder 195 can correspond to the first end 191 of the collet 190, as shown. In other embodiments, however, the first end 197 of each shoulder 195 can be located a distance away from the first end 191 of the collet 190 such that the first end 197 of each shoulder 195 is separated from the first end 191 of the collet 190. In some embodiments, the surface 198 can be a curved surface. In some embodiments, the surface 198 can be a cylindrical surface. In some embodiments, a length of the surface 198 of each shoulder 195 can be less than a length of the groove 127 defined by the internal surface 130 of the collet housing 120. The second end 199 of each shoulder 195 of the collet 190 can be configured to matingly engage with or against the second shoulder 131 of the collet housing 120 to transmit a load between the collet housing 120 and the collet 190 that can be at least partially aligned with the longitudinal axis 103 of the connector assembly 100. In some embodiments, the collet 190 can be formed, manufactured, or machined from a metallic material such as steel, a steel alloy, or any other suitable material.

It should be understood that, in addition to the inner groove 127 defined by the internal surface 130 of the collet housing 120, the internal surface 130 of the collet housing 120 can further define one or more additional inner grooves. Each additional inner groove can be defined by an additional first shoulder, an additional internal cylindrical surface, and an additional second shoulder. Similarly, in addition to the shoulder 195, one or more of the plurality of the fingers 194 can include one or more additional shoulders that can include a first end, a cylindrical surface, and a second end disposed on the external surface 196 of the finger 194. In such embodiments, the collet 190 can be secured within the collet housing 120 via the second end 199 of at least one shoulder 195 and via a second end of at least one additional shoulder disposed on the external surface 196 of the same finger 194 that can matingly engage or abut against the additional first shoulder of the additional inner groove defined by the internal surface 130 of the collet housing 120.

In some embodiments, the mandrel retainer 210 can be at least partially disposed within the bore 173 defined by the housing 170. In some embodiments, as shown, the mandrel retainer 210 can be a separate structure that can be secured to the housing 170 between the first end 171 and the second end 172 of the housing 170. In other embodiments, not shown, the mandrel retainer 210 can be an extension of an internal surface 174 of the housing 170. In some embodiments, the mandrel retainer 210 can have a first side 211 and a second side 212. In some embodiments, the mandrel retainer 210 can define a non-circular aperture 213 therethrough that can have an inner surface 217.

In some embodiments, the non-circular aperture 213 can have a triangular shape, a rectangular shape, a pentagonal shape, a hexagonal shape, an oval shape, or any other non-circular shape. In some other embodiments, not shown, the mandrel retainer 210 can have or include at least one retaining surface, for example, a flat surface, a "key" or a "tab". In embodiments that include the first housing part 180 and the second housing part 185, the mandrel retainer 210 can be disposed between the end 186 of the second housing part 185 and the end 182 of the first housing part 180. In some embodiments, the mandrel retainer 210 can include a tab 214 extending from a perimeter thereof that can define a bore 215 therethrough. In some embodiments, the mandrel retainer 210 can be formed, manufactured, or machined from a metallic material such as steel, a steel alloy, or any other suitable material.

In some embodiments, the mandrel 230 can include a first end 231 and a second end 232. In some embodiments, the mandrel 230 can define a first surface 237 toward the first end of thereof that extends radially outward from a least a portion of the mandrel 230. In some embodiments, the first surface 237 of the mandrel 230 can be a flange disposed toward or at the first end 231 of the mandrel 230.

In some embodiments, the mandrel 230 can further include a second surface 234, a third surface 235 and a transition surface 236. In some embodiments, the first surface 237 can be configured as a surface that can extend radially outward from at least a portion of the second surface 234 and/or the first end 231 of the mandrel 230. In some embodiments, the first surface 237 can have a dimension that is greater than a dimension of the second surface 234 and the second surface 234 can have a dimension that is greater than the third surface 235. In some embodiments the second surface 234 can be a second cylindrical surface, the third surface 235 can be third cylindrical surface, and the first surface 237 can be a first cylindrical surface. In such embodiments, a diameter of the first surface 237 can be greater than a diameter of the second surface 234, and the diameter of the second surface 234 can be greater than a diameter of the third surface 235. The transition surface 236 can be disposed between the second surface 234 and the third surface 235.

In some embodiments, the second surface 234 can be adjacent to or abut with a side of the first surface 237 opposite the first end of the mandrel 230. In some embodiments, the second surface 234 and the first surface 237 can meet at a 90 degree angle with respect to one another as shown via reference number 238 in FIG. 3. In some embodiments, the second surface 234, the third surface 235, and the transition surface 236 each can have any desired outer cross-sectional shape or profile, including a frusto-conical shape or a parabolic cross-sectional shape. In some embodiments, transition surface 236 can have a diameter that continually increases from the diameter of the third surface 235 to the diameter of the second surface 234. In some embodiments, at least a portion of the transition surface 236 can be a frusto-conical shaped surface.

In some embodiments, the second surface 234 can have a diameter that can be greater than an inner diameter of the first end 191 of the collet 190 and the third surface 235 can have an outer diameter that can be less than the inner diameter of the first end 191 of the collet 190 when the fingers 194 of the collet 190 are in an undeflected state. In some embodiments, the mandrel 230 can be formed, manufactured, or machined from a metallic material such as steel, a steel alloy, or any other suitable material.

In some embodiments, the mandrel 230 can be disposed within the housing 170 such that the mandrel 230 can be rotationally restrained about the longitudinal axis 103 of the connector assembly 100 by the mandrel retainer 210 relative to the housing 170 and the mandrel retainer 210. In embodiments that include a mandrel retainer 210 that defines the aperture 213, the mandrel 230 can be disposed through the aperture 213 defined by the mandrel retainer 210 such that the mandrel 230 can be rotationally restrained about the longitudinal axis 103 of the connector assembly 100 by the mandrel retainer 210 relative to the housing 170 and the mandrel retainer 210. In some embodiments, the mandrel 230 can be movable or can move relative to the collet 190, the housing 170, and/or the mandrel retainer 210 along or in a direction that can be parallel to the longitudinal axis 103 of the connector assembly 100. In some embodiments, the mandrel 230 can include an exterior surface 233 that can have a non-circular external cross-sectional shape that can engage with the inner surface 217 of the mandrel retainer 210 to restrict the mandrel 230 from rotating relative to the mandrel retainer 210 and the housing 170.

In some embodiments, as shown, the mandrel 230 can include a first mandrel part 230a and a second mandrel part 230b. In such embodiments, the first surface 237 can be integral with the first mandrel part 230a. Said another way, in some embodiments, the first mandrel part 230a can be machined, milled, or otherwise formed from a single piece of material. In some embodiments, a second end 245 of the first mandrel part 230a can include a threaded outer surface 246. In some embodiments, the second mandrel part 230b can define a bore 250 at least partially therethrough. In some embodiments, the bore 250 can be located toward the first end 247 of the second mandrel part 230b and can include a threaded inner surface 248 and a second end 245 of the first mandrel part 230a can define a threaded outer surface 246. In such embodiments, the first end 247 of the second mandrel part 230b and the second end of the first mandrel part 230a can be threadedly connected to one another to form the mandrel 230.

In some embodiments, the second mandrel part 230b can include the exterior surface 233 of the mandrel 230 that can engage with the inner surface 217 of the mandrel retainer 210 to restrict the mandrel 230 from rotating relative to the mandrel retainer 210 and the housing 170. The bore 250 defined by the second mandrel part 230b of the mandrel 230 can be aligned with the longitudinal axis 103 of the connector assembly 100. In other embodiments, the second end 245 of the first mandrel part 230a can include a threaded inner surface and the first end 247 of the second mandrel part 230b can include a threaded outer surface, not shown.

Figure 8:
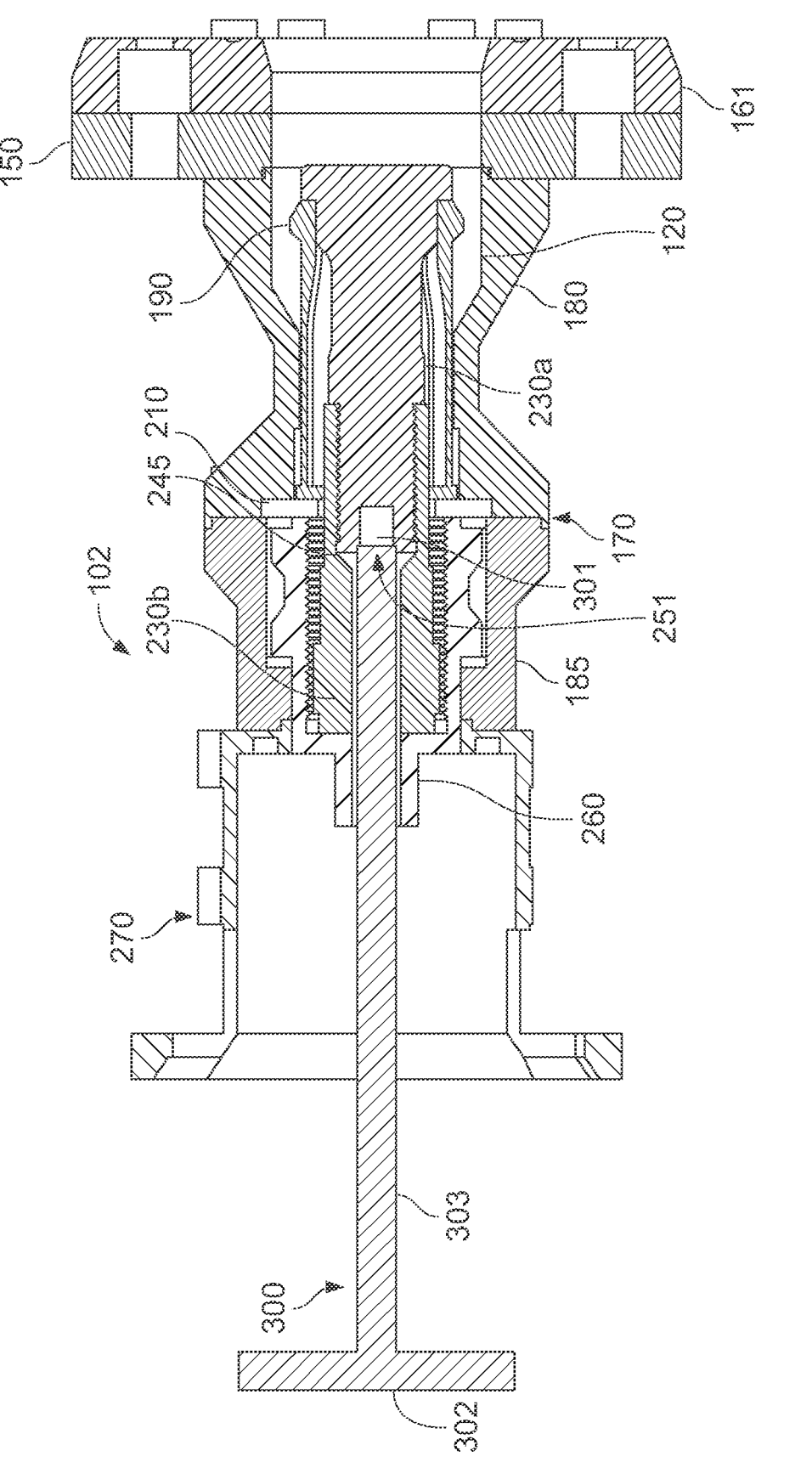
FIG. 8 depicts a cross-sectional view of the second connector part shown in FIG. 1 that further includes an override tool, according to one or more embodiments described.

As shown in FIG. 8 and as described in more detail below, in some embodiments, the second end 245 of the first mandrel part 230a can define a bore 251 at least partially therethrough that can be configured to receive an override tool 300 as is described in more detail below. In some embodiments, the bore 251 can be aligned with the longitudinal axis 103 of the connector assembly 100 and can have a non-circular cross-sectional shape. In some embodiments, the bore 251 can have a triangular shape, a rectangular shape, a pentagonal shape, a hexagonal shape, an oval shape, or any other non-circular shape. As shown, the bore 251 can have a rectangular, e.g., a square, cross-sectional shape.

Referring to FIGS. 1, 3, 4 and 7 collectively, in some embodiments, the drive nut 260 can include a first end 261 and a second end 262. The drive nut 260 can be disposed within the longitudinal bore 173 defined by the housing 170. The second end 232 of the mandrel 230 can be connected to the first end 261 of the drive nut 260. In some embodiments, the second end 232 of the mandrel 230 can be threadingly connected to the first end 261 of the drive nut 260. Said another way, the second end 232 of the mandrel 230 and the first end 261 of the drive nut 260 can be threadingly coupled to one another such that as the drive nut 260 is rotated in a first direction relative to the housing 170, the drive nut 260 can move or displace the mandrel 230 along or in a direction that is parallel to the longitudinal axis 103 of the connector assembly 100. In some embodiments, the second end 262 of the drive nut 260 can include a nut 264 that can be configured to interface with a tool, for example a torque tool that can be operated by diver(s) or a remotely operated vehicle. In some embodiments, the nut 264 can protrude at least partially through the second end 172 of the housing 170 and can have a cross-sectional shape, for example a polygonal cross-sectional shape, to allow a torque tool to apply a torque to the second end 262 of the drive nut 260. In some embodiments the nut 264 can be a square cross-section nut, or hexagonal cross section nut, or any other cross-sectional shaped nut that can interface with the corresponding torque tool. In other embodiments, not shown, the second end 262 of the drive nut 260 can include an aperture, e.g., a socket, that can be configured to receive a torque tool drive bit to allow the torque tool to apply the torque to the second end 262 of the drive nut 260.

In some embodiments, the first end 261 of the drive nut 260 can define a bore 263 at least partially therethrough that can be orientated or aligned with the longitudinal axis 103. In some embodiments, the bore 263 defined by the first end 261 of the drive nut 260 can have a threaded inner surface 266. In such embodiments, the second end 232 of the mandrel 230 can include a threaded outer surface 240 that can be threadingly engaged with the threaded inner surface 266. In other embodiments, not shown, the outer surface of the drive nut 260 can be threaded and the mandrel 230 can define a bore that can have a threaded inner surface that can be threadingly engaged with the outer surface of the drive nut 260.

As the drive nut 260 rotates relative to the housing 170 and the mandrel 230, the drive nut 260 can move the mandrel 230 in a direction that is along or substantially parallel to the longitudinal axis 103 of the connector assembly 100. Said another way, the second end 232 of the mandrel 230 can be drawn into the bore 263 of the first end 261 of the drive nut 260 as the drive nut 260 is rotated in a first direction relative to the housing 170 and the mandrel 230. In some embodiments, the mandrel 230 can be pushed out of the bore 263 defined by the first end 261 of the drive nut 260 as the drive nut 260 is rotated in a second direction that is opposite of the first direction. In some embodiments, the drive nut 260 can be formed, manufactured, or machined from a metallic material such as steel, a steel alloy, or any other suitable material.

In some embodiments, the torque bucket 270 of the second connector part 102 can include a first end 271 and a second end 272. The first end 271 of the torque bucket 270 can be disposed on or connected to the second end 172 of the housing 170 such that the torque bucket 270 is fixed to the second end 172 of the housing 170. In some embodiments, the torque bucket 270 can define a plurality of fastener bores 273 and the second end 172, e.g., the shoulder 177, of the housing 170 can define a corresponding plurality of threaded bores 277 and the torque bucket 270 can be bolted or otherwise attached to the second end 172 of the housing 170 via the plurality of fasteners 274. In other embodiments (not shown), the first end 271 of the torque bucket 270 can include the shoulder 177 that is shown as being part of the housing 170 that can define a plurality of threaded bores 277 and the second end 172 can include an annular ring or flange extending from the internal surface 174 of the housing 170 that can include a plurality of corresponding fastener bores. In other embodiments, the first end 271 of the torque bucket 270 can be welded to the second end 172 of the housing 170.

In some embodiments, the torque bucket 270 can be configured to receive at least a portion of a torque tool. In some embodiments, the torque bucket 270 can be configured to receive a fixed portion of a torque tool and a rotating portion of the torque tool can be disposed about the nut 264 of the drive nut 260 such that the torque tool can impart a torque on the drive nut 260 to rotate the drive nut 260 relative to the torque bucket 270 and the housing 170. In some embodiments, the torque bucket 270 can define at least one slot 275, two are shown which can be configured to receive a corresponding key disposed on the fixed portion of the torque tool through which the torque can be transmitted between the nut 264, the torque bucket 270, and the housing 170. In some embodiments, the torque bucket 270 can be formed, manufactured, or machined from a metallic material such as steel, a steel alloy, or any other suitable material.

As best shown in FIG. 4, in some embodiments, when the second connector part 102 is disposed in a position relative to the first connector part 101 such that the plurality of shoulders 195 of the collet 190 can be at least partially inserted into the inner groove 127 defined by the collet housing 120, the first connector part 101 and the second connector part 102 can be said to be disposed in a connectable position relative to one another. Said another way, when the surface 198 of the shoulder 195 is at least partially aligned with the inner groove 127 such that the first end 197 of the shoulder 195 is at least partially overlapping with the first shoulder 129 of the collet housing 120 and/or such that the second end 199 of the shoulder 195 is at least partially overlapping with the second shoulder 131 of the collet housing 120, the first connector part 101 and the second connector part 102 are in the connectable position relative to one another. In some embodiments, when the second connector part 102 is positioned such that the plurality of shoulders 195 can be at least partially inserted into the inner groove 127 defined by the collet housing 120 and a longitudinal axis 119 of each first coupler bore 113 defined by the first coupler plate 110 (see FIG. 2) and a longitudinal axis 159 of each second coupler bore 153 defined by the second coupler plate 150 (see FIG. 3) are substantially aligned with one another, the first connector part 101 and the second connector part 102 are in the connectable position relative to one another. In some embodiments, the longitudinal axis 119 of each first coupler bore 113 and/or the longitudinal axis 159 of each second coupler bore 153 can be central longitudinal axes of the first coupler bore 113 and the second coupler bore 153 respectively.

In some embodiments, when the first connector part 101 and the second connector part 102 are in the connectable position relative to one another, the first end 261 of the drive nut 260 can abut against the second side 212 of the mandrel retainer 210 as the drive nut 260 is rotated in the first direction relative to the mandrel 230. In other embodiments, when the first connector part 101 and the second connector part 102 are in the connectable position relative to one another, the first end 261 of the drive nut 260 can abut against an optional bearing 280 (described in more detail below) that can be disposed between the first end 261 of the drive nut 260 and the second side 212 of the mandrel retainer 210 as the drive nut 260 is rotated in the first direction relative to the mandrel 230.

In some embodiments, when the drive nut 260 is rotated in the first direction relative to the mandrel 230, the exterior surface 233 of the mandrel 230 can react against the inner surface 217 of the mandrel retainer 210 to prevent or restrict the mandrel 230 from rotating with the drive nut 260 relative to the mandrel retainer 210 and housing 170. Said another way, the mandrel retainer 210 can exert a torque on the mandrel 230 that can oppose a torque applied to the mandrel 230 by the drive nut 260. As the drive nut 260 is rotated relative to the mandrel 230 in a first direction, the mandrel 230 can be drawn toward the second end 172 of the housing 170 and the second surface 234 of the mandrel 230 can become disposed between the fingers 194 of the collet 190 and can radially displace or radially spread the plurality of fingers 194 such that each shoulder 195 can be at least partially disposed and secured within the inner groove 127 defined by the collet housing 120. When the plurality of shoulders 195 is disposed and secured within the inner groove 127 defined by the collet housing 120, the first connector part 101 and the second connector part 102 can be connected to one another.

In some embodiments, when the first connector part 101 and the second connector part 102 are in the connectable position with respect to one another or connected to one another and the drive nut 260 is rotated in the first direction, the mandrel 230 can be drawn toward the second end 172 of the housing 170. In some embodiments, the first surface 237 of the mandrel 230 can abut against the first end 191 of the collet 190 to push or move the collet 190 toward the second end 172 of the housing 170. As best shown in FIG. 5, in some embodiments, the first surface 237 of the mandrel 230 can abut against the first end 191 of the collet 190 and the second end 199 of each shoulder 195 of the collet 190 can abut against the second shoulder 131 of the collet housing 120. As the drive nut 260 is further rotated in the first direction, the drive nut 260 can exert a force on the mandrel 230 in a direction substantially parallel to the longitudinal axis 103 of the connector assembly 100 and the first end 261 of the drive nut 260 can transmit at least a portion of the force to the second side 212 of the mandrel retainer 210, the mandrel retainer 210 can transmit at least a portion of the force to the housing 170, and the housing 170 can transmit at least portion of the force to the second coupler plate 150 as an axial force between the second coupler plate 150 and the first coupler plate 110, or between corresponding fluid coupler first parts 105 and fluid coupler second parts 106. In some embodiments, this axial force between the first coupler plate 110 of the first connector part 101 and the second coupler plate 150 can be a preload force.

In some embodiments, the second connector part 102 can include a first bearing 280 that can be disposed between the first end 261 of the drive nut 260 and the second side 212 of the mandrel retainer 210 to reduce a frictional torque between the first end 261 of the drive nut 260 can and the second side 212 of the mandrel retainer 210. In some embodiments, the connector assembly 100 can include a second bearing 281 that can be disposed between the second end 262 of the drive nut 260, or a shoulder 267 of the drive nut 260 and the shoulder 177 of the housing 170 to reduce a frictional torque between the drive nut 260 and the housing 170, between the shoulder 177 of the housing 170 and the shoulder 267 of the drive nut 260. In some embodiments, the second bearing 281 can be disposed between the second end 262 of the drive nut 260 and the first end 271 of the torque bucket 270. In some embodiments, the first bearing 280 and the second bearing 281 can each and independently be a roller bearing, a plain bearing, a bushing, or a friction reducing coating, or any other mechanism that can reduce a sliding friction between two components.

In some embodiments, the optional alignment guide 161 can include or define a frusto-conical external surface 162. In some embodiments, the optional alignment guide 161 can be connected to or disposed on the first side 151 of the second coupler plate 150. In some embodiments, the alignment guide can be connected to the first side 151 of the second coupler plate 150 via a plurality of fasteners 163. In some embodiments, the optional alignment guide 161 can be configured to be disposed within or matingly engaged with the alignment guide 141 of the first connector part 101 to guide the second connector part 102 toward the connectable position relative to the first connector part 101. Said another way, in some embodiments, the alignment guide 141 can be configured to receive the second coupler plate 150 or when present, the optional alignment guide 161 and the second coupler plate 150 of the second connector part 102 to guide the second connector part 102 toward the connectable position relative to the first connector part 101. In some embodiments, the alignment guide 141, the adaptor plate 143, and the optional alignment guide 161 can be formed from a thermoplastic material such as an acetal homopolymer commercially available under name DELRIN®, a polymer material such as ultra-high molecular weight polyethylene (UHMWPE) material, a metallic material, or any other suitable material.

Referring to FIGS. 1, 6, and 7, in some embodiments, the first connector part 101 can include a clocking guide 117 and the second connector part can include a clocking key 157. In some embodiments, the clocking guide 117 can be disposed toward a perimeter 118 of the first connector part 101. In some embodiments, the clocking key 157 can be disposed toward a perimeter of the second connector part 102. In some embodiments, the clocking guide 117 can define an internal profile that can guide or rotate the second connector part 102 about the longitudinal axis 103 of the connector assembly 100 relative to the first connector part 101 when the clocking key 157 contacts the internal profile of the clocking guide 117 as the second connector part 102 is moved into the connectable position relative to the first connector part 101. In other embodiments, not shown, the clocking guide 117 can be disposed on the second connector part 102 and the clocking key 157 can be disposed on the first connector part 101. In some embodiments, the clocking guide 117 and the clocking key 157 can each be formed, manufactured or machined from a material such as steel, a steel alloy, aluminum, a polymer, or any other suitable material.

In some embodiments, when the second connector part 102 is moved toward the first connector part 101, the frusto-conical external surface 162 of the alignment guide 161 can come into contact with the frusto-conical inner surface 142 of the first connector part 101. When the second connector part 102 is further moved toward the first connector part 101 the alignment guide 161 can become positioned within the alignment guide 141 and simultaneously the clocking key 157 can become engaged with the clocking guide 117. In such embodiments, as the second connector part 102 continues to move toward the first connector part 101 the clocking key 157 and the clocking guide 117 can rotate the second connector part 102 about the longitudinal axis 103 relative to the first connector part 101 such that the second connector part 102 can be disposed at the connectable position relative to the first connector part 101. In some embodiments, the alignment guide 161 of the second connector part 102 and the alignment guide 141 of the first connector part 101 can each be formed, manufactured or machined from a material such as steel, a steel alloy, aluminum, a polymer, or any other suitable material.

In some embodiments, the connector assembly 100 can include one or more fine alignment pins 165. In some embodiments, the fine alignment pins 165 can be disposed on the second side 112 of the first coupler plate 110 and the second coupler plate 150 can define a plurality of corresponding fine alignment bores 166. In some embodiments, the alignment guide 161, the second coupler plate 150, and the first housing part 180 can define a set of alignment bores 166a, 166b, 166c, respectively, that can be aligned with one another to receive the fine alignment pins 165. The fine alignment pins 165 and fine alignment bores 166a, 166b, 166c can further guide the second connector part 102 toward the connectable position relative to the first connector part 101. In some embodiments, each fine alignment pin 165 can include a first end 167 that can be connected to or disposed on the second side 112 of the first coupler plate 110. In some embodiments, each fine alignment pin 165 can have a second end 168 that can have a conical, a frusto conical, or any other tapered shape, for example a paraboloid shape to help guide each fine alignment pin 165 into a corresponding fine alignment bore 166. In some embodiments, the fine alignment pins 165 can be formed, manufactured or machined from a metallic material such as steel, a steel alloy, aluminum, or any other suitable material. In some embodiments, when at least a portion of each of the plurality of fine alignment pins 165 are disposed within the fine alignment bores 166 the second connector part 102 can be disposed at the connectable position relative to the first connector part 101 such that each coupler bore 153 defined by the second coupler plate 150 can be aligned with a corresponding coupler bore 113 defined by the first coupler plate 110. In some other embodiments (not shown), the fine alignment pins 165 can be disposed on the second connector part 102 and the plurality of fine alignment bores 166 can be defined by the first coupler plate 110 of the first connector part 101.

In embodiments that include the fine alignment pins 165 and fine alignment bores 166, when the second connector part 102 is moved toward the first connector part 101, the frusto-conical external surface 162 of the second connector part 102 can come into contact with, the frusto-conical inner surface 142 of the first connector part 101. When the second connector part 102 is moved further toward the first connector part 101, the alignment guide 161 can become positioned within the alignment guide 141 and simultaneously the clocking key 157 can become engaged with the clocking guide 117 and the clocking key 157 and the clocking guide 117 can rotate the second connector part 102 about the longitudinal axis 103 such the fine alignment bore 166 can be positioned such that a corresponding fine alignment pin 165 can be disposed within a corresponding fine alignment bore 166. As the second connector part 102 is further moved toward the first connector part 101, the fine alignment pins 165 can become disposed within the fine alignment bores 166 and the second connector part 102 can be disposed in the connectable position relative to the first connector part 101 and the first connector part 101 and the second connector part 102 can be rotatively aligned about the longitudinal axis 103 such that the longitudinal axis 119 and the longitudinal axis 159 are aligned with one another.

In some embodiments, the second connector part 102 can include an indicator assembly 285 disposed thereon. The indicator assembly 285 can include a rod 286, a spring 287, and an indicator band 290 disposed on the housing 170 or the torque bucket 270. The rod 286 can include a first end 288 and a second end 289 and can move relative to the second connector part 102 in a direction that is substantially parallel to the longitudinal axis 103 of the connector assembly 100. The rod 286 can be secured to the second connector part 102 or the housing 170 via at least one clip, two are shown, 291, 294. In some embodiments, the rod 286 can be sized and positioned such that when the first and second connector parts 101, 102 are in the connectable position relative to one another, the first end 288 of the rod 286 can contact the first coupler plate 110 and the rod 286 can be moved to a position such that the second end 289 of the rod 286 is aligned with the indicator band 290 to indicate that the second connector part 102 is in the connectable or the connected position relative to the first connector part 101.

In some embodiments, the second connector part 102 can include at least one spacer 295 that can be configured to maintain a separation distance between the first coupler plate 110 and the second coupler plate 150 when the first connector part 101 and the second connector part 102 are in the connectable position relative to one another or when the first connector part 101 and the second connector part 102 are connected to one another. In some embodiments, the at least one spacer 295 can include a first end 296 and a second end 297. In some embodiments, the second end 297 of the at least one spacer 295 can be connected to the first side 151 of the second coupler plate 150. In some embodiments, the first end 296 of the at least one spacer 295 can abut with the second side 112 of the first coupler plate 110 and the second end 297 of each spacer 295 can abut with the first side 151 of the second coupler plate 150 to maintain a separation distance between the first coupler plate 110 and the second coupler plate 150 when the first connector part 101 and the second connector part 102 are in the connectable position relative to one another or when the first connector part 101 and the second connector part 102 are connected to one another.

In some embodiments, the second end 297 of the at least one spacer 295 can be threaded into a corresponding bore 298 of the second coupler plate 150 as shown, or the first end 296 can be threaded into a corresponding bore defined by the first coupler plate 110, not shown. In some embodiments, the at least one spacer 295 can maintain a specified or predetermined separation distance between the first coupler plate 110 of the first connector part 101 and the second coupler plate 150 of the second connector part 102 when the first connector part 101 and the second connector part 102 are in the connectable position relative to one another or are connected to one another. In some embodiments, at least a portion of the preload force can be transmitted between the second connector part 102 and the first connector part 101 via the at least one spacer 295. In some embodiments, the at least one spacer 295 can maintain a separation distance between the second coupler plate 150 of the second connector part 102 and the first coupler plate 110 of the first connector part 101 when the second connector part 102 and the first connector part 101 are subjected to the preload force. The at least one spacer 295 can each be any suitable shape including a cylinder, a ring, or a cuboid and be manufactured from a material such as a polymer, aluminum, steel or other similar material.

As noted above, in some embodiments, the connector assembly 100 can include at least one fluid coupler first part 105 and at least one fluid coupler second part 106 that can matingly engage with one another to establish a fluid connection therebetween. In some embodiments, the fluid coupler first part 105 and the fluid coupler second part 106 can each be connected to a corresponding fluid conduit that can be configured to convey a fluid. In some embodiments, the at least one fluid coupler first part and the at least one fluid coupler second part 106 can be a HUNTING® RS-Series/20KSI Coupling. In some embodiments, the fluid coupler first part 105 can be a HUNTING® RS-Series/20KSI Female Coupling and the fluid coupler second part 106 can be a corresponding HUNTING® RS-Series/20KSI Male Coupling or vice-versa. As noted above, in some embodiments, not shown, the connector assembly 100 can include at least one electrical coupler first part disposed within the first coupler plate 110 and at least one electrical coupler second part disposed within the second coupler plate 150. As also noted above, in some embodiments, not shown, the connector assembly 100 can include at least one optical coupler first part disposed within the first coupler plate 110 and at least one optical coupler second part disposed within the second coupler plate 150.

In some embodiments, at least a portion of the preload force can be transmitted between the fluid coupler second part 106 disposed within one of the second coupler bores 153 and the fluid coupler first part 105 disposed within one of the first coupler bores 113 defined by the first coupler plate 110 of the first connector part 101. In some embodiments, this portion of the preload force between the fluid coupler first part 105 and the fluid coupler second part 106 can react or resist a separation force resulting from an internal fluid pressure (for example an end cap pressure) of a fluid contained within the fluid coupler first part 105 and the corresponding fluid coupler second part 106 to keep the at least one fluid coupler first part 105 and a corresponding fluid coupler second part 106 mated to or fluidly coupled to one another. Said another way, this portion of the preload force can be sufficient to maintain the fluid coupler first part 105 and the corresponding fluid coupler second part 106 mated to one another or fluidly coupled to one another. In some embodiments, this portion of the preload force can be sufficient to overcome or react a so called "pressure end load" (i.e., a pressure of the internal fluid within the fluid coupler first part 105 coupled to the fluid coupler second part 106 times the cross sectional area of the internal flow path through the fluid coupler first part 105 coupled to the fluid coupler second part 106). In some embodiments, a portion of the preload force can be transmitted between the first coupler plate 110 and the second coupler plate 150 via both the fluid coupler first part 105 coupled to the fluid coupler second part 106 and the spacer 295. In some embodiments, the pressure end load reacting on the first coupler plate 110 from each of the plurality of fluid coupler first parts 105 and a corresponding end pressure load reacting on the second coupler plate 150 from each of the plurality of fluid coupler second parts 106 can be in a range from about 10 kN, about 15 kN, or about 20 kN to about 23 kN, about 25 kN, or about 28 kN.

In some embodiments, the second connector part 102 can include a padeye 292 that can be connected to the torque bucket 270 or the housing 170 via a plurality of fasteners 293. In some embodiments, the padeye 292 can be used to facilitate a connection between the second connector part 102 and the first connector part 101 and/or can be used to lift the second connector part 102.

FIG. 8 depicts a cross-sectional view of the second connector part 102 of the assembly 100 that further includes an override tool 300, according to one or more embodiments. In some embodiments the override tool 300 can include a first end 301, a second end 302, and a mid-body 303. In some embodiments, the first end 301 of the override tool 300 can have a non-circular cross-sectional shape that can interface and correspond with and be inserted into the bore 251 defined by the second end 232 of the first mandrel part 230*a*. In some embodiments, the second end 302 of the override tool 300 can be configured as a "T-handle" a "D-handle", a "X handle" or any other configuration that can be manipulated by or interface with a diver or a remotely operated vehicle. In some embodiments, the second connector part 102 can be disconnected from the first connector part 101 by inserting the first end 301 of the override tool 300 into the bore 251 and rotating override tool 300 in a second direction such that the first mandrel part 230*a* rotates relative to second mandrel part 230*b* to separate the second mandrel part 230*b* and the first mandrel part 230*a* from one another to separate or disconnect the first connector part 101 and the second connector part 102 from one another.

In some embodiments, a process for connecting the first connector part 101 and the second connector part 102 of the connector assembly 100 to one another can include obtaining the connector assembly 100, positioning the second connector part 102 in a connectable position relative to the first connector part 101. The process can include positioning the first surface 234 of the mandrel 230 at least partially within the longitudinal bore 193 defined by the collet 190 and radially displacing the plurality of fingers 194 to at least partially dispose the shoulder 195 of each finger 194 within the inner groove 127 defined by the collet housing 120.

In some embodiments of the process, the connector assembly 100 can include at least one spacer 295 configured to maintain a separation distance between the first coupler plate 110 and the second coupler plate 150 when the second connector part 102 is in the connectable position relative to the first connector part 101, or when the first connector part 101 and the second connector part 102 are connected to one another.

In some embodiments of the process, the fluid coupler second part 106 can be disposed within one of the plurality of second coupler bores 153 and the fluid coupler first part 105 can be disposed within a corresponding second coupler bore 113. When the first connector part 101 and the second connector part 102 are connected to one another, the fluid coupler first part 105 and the fluid coupler second part 106 can be connected to one another.

In some embodiments of the process, when the first connector part 101 and the second connector part 102 are connected to one another, the connector assembly 100 can react a separation force resulting from an internal fluid pressure within the fluid coupler first part 105 and the fluid coupler second part 106.

In some embodiments, the process can include rotating the drive nut 260 relative to the housing 170 such that the first surface 237 of the mandrel 230 can abut against the first end 191 of the collet 190 and the second end 199 of each shoulder 195 of the collet 190 can abut against the second shoulder 131 of the collet housing 120. In some embodiments, the process can include rotating the drive nut 260 further in the first direction such that the drive nut 260 can exert a force on the mandrel 230 in a direction substantially parallel to the longitudinal axis 103 of the connector assembly 100 and the first end 261 of the drive nut 260 can transmit at least a portion of the force to the second side 212 of the mandrel retainer 210, the mandrel retainer 210 can transmit at least a portion of the force to the housing 170, and the housing 170 can transmit at least portion of the force to the second coupler plate 150 as an axial force between the second coupler plate 150 and the first coupler plate 110 or between corresponding fluid coupler first parts 105 and fluid coupler second parts 106. In some embodiments, this axial force between the first coupler plate 110 of the first connector part 101 and the second coupler plate 150 can be a preload force.

In some embodiments of the process, the connector assembly 100 can include the alignment guide 161 and the alignment guide 141. In some embodiments of the process, the connector assembly 100 can include the clocking guide 117 and a clocking key 157. In some embodiments of the process, the connector assembly 100 can include the plurality of fine alignment pins 165. In some embodiments of the process, the connector assembly 100 can include the torque bucket 270 and rotating the drive nut 260 is performed by a torque tool configured to engage with the nut 264 of the drive nut 260 and the torque bucket 270.

The present disclosure further relates to any one or more of the following embodiments:

A1. A connector assembly that can include a first connector part, comprising a first connector part, comprising a first coupler plate having a first side and a second side, wherein the first coupler plate defines a plurality of first coupler bores therethrough, each first coupler bore is configured to receive a coupler first part, and a collet housing extends from the second side of the first coupler plate and defines a bore having an inner surface at least partially therethrough and an inner groove about at least a portion of the inner surface of the bore; and a second connector part, comprising a second coupler plate having a first side and a second side, wherein the second coupler plate defines a plurality of second coupler bores and a collet housing receiving bore therethrough, and each second coupler bore is configured to receive a coupler second part; a housing having a first end and a second end, wherein the housing defines a bore therethrough, the first end of the housing is configured to be secured to the second side of the second coupler plate, and the housing comprises a mandrel retainer; a mandrel having a first end and a second end, wherein the mandrel defines a first surface toward the first end of thereof that extends radially outward from a least a portion of the mandrel; a collet having a first end and a second end, wherein a plurality of fingers is disposed toward or at the first end of the collet, the collet defines a bore therethrough, the mandrel is at least partially disposed within the bore defined by the collet, each finger comprises a shoulder disposed on an external surface thereof, and the shoulder of each finger is configured to be at least partially disposed within the inner groove defined by the collet housing; and a drive nut comprising a first end and a second end at least partially disposed within the housing, wherein the mandrel is movable relative to the collet along a longitudinal axis of the connector assembly, the mandrel is rotationally restrained about the longitudinal axis of the connector assembly by the mandrel retainer, the second end of the mandrel is coupled to the first end of the drive nut, at least a portion of the mandrel, the collet, the mandrel retainer, and at least a portion of the drive nut are disposed within the bore defined by the housing, and the first connector part and the second connector part are connected to one another when the first surface of the mandrel is at least partially disposed within the bore defined by the collet and the shoulder of each finger is at least partially disposed within the inner groove defined by the collet housing.

A2. The connector assembly of paragraph A1, that can be configured such that the first cylindrical surface of the mandrel is at least partially disposed within the bore defined by the collet by rotating the drive nut about the longitudinal axis of the connector assembly.

A3. The connector assembly of paragraph A1 or A2, that can further include a spacer configured to maintain a separation distance between the first coupler plate and the second coupler plate when the first connector part and the second connector part are connected to one another.

A4. The connector assembly of any one of paragraphs A1 to A3, that can further include a coupler first part disposed within one of the first coupler bores and a coupler second part disposed within a corresponding one of the second coupler bores, wherein: the coupler first part is a fluid coupler first part and the coupler second part is a fluid coupler second part, and when the first connector part and the second connector part are connected to one another, the coupler first part and the coupler second part are fluidly coupled to one another.

A5. The connector assembly paragraph A4, that can be configured such that when the first connector part and the second connector part are connected to one another, the connector assembly is configured to react a pressure end load resulting from an internal pressure of the fluid coupler first part and the fluid coupler second part.

A6. The connector assembly of paragraph A4 or A5, that can be configured such that the inner groove defined by the collet housing can be defined by a first shoulder, a cylindrical surface, and a second shoulder, the mandrel comprises a flange disposed toward the first end thereof, and when first connector part and the second connector part are connected to one another and the drive nut is rotated relative to the housing, the flange abuts against the first end of the collet and the shoulder of each finger of the collet abuts against the second shoulder of the collet housing to exert a preload force between the fluid coupler first part and the fluid coupler second part and/or between the first coupler plate and the second coupler plate via the spacer.

A7. The connector assembly of any one of paragraphs A1 to A6, that can be configured such that the first end of the drive nut defines a threaded bore, the second end of the mandrel comprises an external threaded surface that is threaded into the threaded bore defined by the first end of the drive nut, and the second end the collet reacts against a first side of the mandrel retainer and the first end of the drive nut reacts against a second side of mandrel retainer to exert the preload force.

A8. The connector assembly of any one of paragraphs A1 to A67, that can be further configured such that the housing comprises a first housing part and a second housing part, the first housing part is disposed on the second coupler plate, an end of the first housing part is connected to an end of the second housing part, and the mandrel retainer is disposed between the first housing part and the second housing part.

A9. The connector assembly of any one of paragraphs A1 to A8, that can be configured such that the mandrel comprises a first mandrel part and a second mandrel part, the second mandrel part is threadingly connected to the first mandrel part, the second mandrel part defines a bore therethrough, the second end of the mandrel is coupled to the first end of the drive nut, the drive nut defines a bore therethrough; and the second end of the first mandrel part defines a bore at least partially therethrough that is configured to receive an override tool through the bores defined by the drive nut and the second mandrel part.

A10. The connector assembly of any one of paragraphs A1 to A9, that can further include an alignment guide disposed on the second side of the first coupler plate that defines a frusto-conical inner surface; and an alignment guide disposed on the first side of the second coupler plate that defines a frusto-conical outer surface configured to engage with the frusto-conical inner surface defined by the alignment guide disposed on the second side of the first coupler plate.

A11. The connector assembly of any one of paragraphs A1 to A10, that can further include a clocking guide and a clocking key, wherein: the clocking guide is disposed on the first coupler plate toward a perimeter thereof and the clocking key is disposed on the second coupler plate toward a perimeter thereof or the clocking guide is disposed on the second coupler plate toward the perimeter thereof and the clocking key disposed on the first coupler plate toward the perimeter thereof, and the clocking key is configured to engage with the clocking guide to rotate the second connector part relative to the first connector part as the second connector part is moved toward the first connector part to align the first connector part with the second connector part.

A12. The connector assembly of any one of paragraphs A1 to A1 l, that can further include a plurality of fine alignment pins, wherein: the plurality of fine alignment pins is disposed on and extend from the second side of the first coupler plate, the second coupler plate defines a plurality of corresponding fine alignment bores, and when each fine alignment pin is at least partially disposed within a corresponding fine alignment bore, each second coupler bore is aligned with a corresponding first coupler bore.

B1. A process for connecting a first connector part and a second connector part of connector assembly to one another, that can include obtaining the connector assembly, wherein: the first connector part comprises: a first coupler plate having a first side and a second side, wherein: the first coupler plate defines a plurality of first coupler bores therethrough, each first coupler bore is configured to receive a coupler first part, and a collet housing extends from the second side of the first coupler plate and defines a bore having an inner surface at least partially therethrough and an inner groove about at least a portion of the inner surface of the bore; and the second connector part comprises: a second coupler plate having a first side and a second side, wherein: the second coupler plate defines a plurality of second coupler bores and a collet housing receiving bore therethrough, and each second coupler bore is configured to receive a coupler second part; a housing having a first end and a second end, wherein: the housing defines a bore therethrough, the first end of the housing is secured to the second side of the second coupler plate, and the housing comprises a mandrel retainer; a mandrel having a first end and a second end, wherein the mandrel defines a first surface toward the first end thereof that extends radially outward from at least a portion of the mandrel; a collet having a first end and a second end, wherein: a plurality of fingers is disposed toward or at the first end of the collet, the collet defines a bore therethrough, the mandrel is at least partially disposed within the bore defined by the collet, each finger comprises a shoulder disposed on an external surface thereof, and the shoulder of each finger is configured to be at least partially disposed within the inner groove defined by the collet housing; and a drive nut comprising a first end and a second end at least partially disposed within the housing, wherein: the mandrel is movable relative to the collet along a longitudinal axis of the connector assembly, the mandrel is rotationally restrained about the longitudinal axis of the connector assembly by the mandrel retainer, the second end of the mandrel is coupled to the first end of the drive nut, and at least a portion of the mandrel, the collet, the mandrel retainer, and at least a portion of the drive nut are disposed within the bore defined by the housing; positioning the first connector part and the second connector part at a connectable position with respect to one another; and radially displacing the plurality of fingers to position the shoulder of each finger at least partially within the inner groove defined by the collet housing.

B2. The process of paragraph B1, wherein the first cylindrical surface of the mandrel is at least partially disposed within the bore defined by the collet by rotating the drive nut about the longitudinal axis of the connector assembly.

B3. The process of paragraph of B1 or B2, wherein: the connector assembly comprises a coupler first part disposed within one of the first coupler bores and a coupler second part disposed within one of the second coupler bore, the coupler first part is a fluid coupler first part and the coupler second part is a fluid coupler second part, and when the first connector part and the second connector part are connected to one another, the fluid coupler first part and the fluid coupler second part are fluidly coupled to one another.

B4. The process of paragraph B3, wherein: when the first connector part and the second connector part are connected to one another, the connector assembly reacts a separation force from an internal fluid pressure of the fluid coupler first part and the fluid coupler second part.

B4. The process of paragraph B3 or B4, wherein: the inner groove defined by the collet housing is defined by a first shoulder, an internal cylindrical surface and a second shoulder, the mandrel comprises a flange disposed toward the first end thereof, and radially displacing the plurality of fingers comprises rotating the drive nut relative to the housing such that the flange of the mandrel abuts against the first end of the collet and the shoulder of each finger of the collet abuts against the second shoulder of the collet housing to exert a preload force between the fluid coupler first part and the fluid coupler second part, or between the first coupler plate and the second coupler plate via the spacer.

B5. The process of any one of paragraphs B1 to B4, wherein, wherein: the first end of the drive nut defines a threaded bore, the second end of the mandrel comprises an external threaded surface that is threaded into the threaded bore defined by the first end of the drive nut, and the second end the collet reacts against a first side of the mandrel retainer and the first end of the drive nut reacts against a second side of the mandrel retainer to exert the preload force.

B6. The process of any one of paragraphs B1 to B5, wherein: the connector assembly further comprises an alignment guide disposed on the second side of the first coupler plate and an alignment guide disposed on the first side of the second coupler plate, the first alignment guide comprises a frusto-conical inner surface and the second alignment guide comprises a frusto-conical exterior surface configured to engage with the frusto-conical inner surface of the first alignment guide; the process further comprising disposing at least a portion of the second coupler plate within the first alignment guide disposed on the first coupler plate.

C1. A process for disconnecting a first connector part and a second connector part of a connector assembly from one another, that can include: obtaining an override tool and the connector assembly, wherein: the first connector part comprises: a first coupler plate having a first side and a second side, wherein: the first coupler plate defines a plurality of first coupler bores therethrough, each first coupler bore is configured to receive a coupler first part, and a collet housing that extends from the second side of the first coupler plate and defines a bore having an inner surface at least partially therethrough and an inner groove about at least a portion of the inner surface of the bore; and the second connector part comprises: a second coupler plate having a first side and a second side, wherein: the second coupler plate defines a plurality of second coupler bores and a collet housing receiving bore therethrough, and each second coupler bore is configured to receive a coupler second part; a housing having a first end and a second end, wherein: the housing defines a bore therethrough, the first end of the housing is secured to the second side of the second coupler plate, and the housing comprises a mandrel retainer; a mandrel comprising a first mandrel part and a second mandrel part, wherein: a first end of the second mandrel part is threadingly connected to a second end of the first mandrel part, the second mandrel part defines a bore therethrough, the first mandrel part defines a first surface toward a first end thereof that extends radially outward from at least a portion of the first mandrel part, and the second end of the first mandrel part defines a bore at least partially therethrough that is configured to receive an override tool through the bore defined by the second mandrel part; a collet having a first end and a second end, wherein: a plurality of fingers is disposed toward or at the first end of the collet, the collet defines a bore therethrough, the mandrel is at least partially disposed within the bore defined by the collet, each finger comprises a shoulder disposed on an external surface thereof, and the shoulder of each finger is at least partially disposed within the inner groove defined by the collet housing; and a drive nut comprising a first end and a second end at least partially disposed within the housing, wherein: the drive nut defines a bore therethrough, the mandrel is movable relative to the collet along a longitudinal axis of the connector assembly, the mandrel is rotationally restrained about the longitudinal axis of the connector assembly by the mandrel retainer, a second end of the second mandrel part is threadingly coupled to the first end of the drive nut, and at least a portion of the mandrel, the collet, the mandrel retainer and at least a portion of the drive nut are disposed within the bore defined by the housing; inserting an end of the override tool through the bore defined by the drive nut, the bore defined by the second mandrel part, and into the bore defined by the second end of the first mandrel part; and rotating the first mandrel part relative to the second mandrel part by rotating the override tool to disconnect the first connector part from the second connector part.

C2. The process of C1, wherein: the coupler first part is a fluid coupler first part and the coupler second part is a fluid coupler second part, and when the first connector part and the second connector part are connected to one another, the fluid coupler first part and the fluid coupler second part are fluidly coupled to one another.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should, therefore, be expressly understood that such modifications and adaptations may be devised without departing from the basic scope thereof, and the scope thereof can be determined by the claims that follow.

What is claimed is:

1. A connector assembly, comprising:
a first connector part, comprising:
a first coupler plate having a first side and a second side, wherein:
the first coupler plate defines a plurality of first coupler bores therethrough,
each first coupler bore is configured to receive a coupler first part, and
a collet housing extends from the second side of the first coupler plate and defines a bore having an inner surface at least partially therethrough and an inner groove about at least a portion of the inner surface of the bore; and
a second connector part, comprising:
a second coupler plate having a first side and a second side, wherein:
the second coupler plate defines a plurality of second coupler bores and a collet housing receiving bore therethrough, and
each second coupler bore is configured to receive a coupler second part;
a housing having a first end and a second end, wherein:
the housing defines a bore therethrough,
the first end of the housing is configured to be secured to the second side of the second coupler plate, and the housing comprises a mandrel retainer;
a mandrel having a first end and a second end, wherein the mandrel defines a first surface toward the first end thereof that extends radially outward from a least a portion of the mandrel;
a collet having a first end and a second end, wherein:
a plurality of fingers is disposed toward or at the first end of the collet,
the collet defines a bore therethrough,
the mandrel is at least partially disposed within the bore defined by the collet,
each finger comprises a shoulder disposed on an external surface thereof, and
the shoulder of each finger is configured to be at least partially disposed within the inner groove defined by the collet housing; and
a drive nut comprising a first end and a second end at least partially disposed within the housing, wherein:
the mandrel is movable relative to the collet along a longitudinal axis of the connector assembly,
the mandrel is rotationally restrained about the longitudinal axis of the connector assembly by the mandrel retainer,
the second end of the mandrel is coupled to the first end of the drive nut,
at least a portion of the mandrel, the collet, the mandrel retainer, and at least a portion of the drive nut are disposed within the bore defined by the housing, and
the first connector part and the second connector part are connected to one another when the first surface of the mandrel is at least partially disposed within the bore defined by the collet and the shoulder of each finger is at least partially disposed within the inner groove defined by the collet housing.

2. The connector assembly of claim 1, wherein the first surface of the mandrel is at least partially disposed within the bore defined by the collet by rotating the drive nut about the longitudinal axis of the connector assembly.

3. The connector assembly of claim 2, further comprising a spacer configured to maintain a separation distance between the first coupler plate and the second coupler plate when the first connector part and the second connector part are connected to one another.

4. The connector assembly of claim 3, further comprising:
a coupler first part disposed within one of the first coupler bores and a coupler second part disposed within a corresponding one of the second coupler bores, wherein:
the coupler first part is a fluid coupler first part and the coupler second part is a fluid coupler second part, and
when the first connector part and the second connector part are connected to one another, the fluid coupler first part and the fluid coupler second part are fluidly coupled to one another.

5. The connector assembly of claim 4, wherein, when the first connector part and the second connector part are connected to one another, the connector assembly is configured to react a pressure end load resulting from an internal pressure of the fluid coupler first part and fluid coupler second part.

6. The connector assembly of claim 4, wherein:
the inner groove defined by the collet housing is defined by a first shoulder, a cylindrical surface, and a second shoulder,
the mandrel comprises a flange disposed toward the first end thereof, and when first connector part and the second connector part are connected to one another and the drive nut is rotated relative to the housing, the flange abuts against the first end of the collet and the shoulder of each finger of the collet abuts against the second shoulder of the collet housing to exert a preload force between the fluid coupler first part and the fluid coupler second part and/or between the first coupler plate and the second coupler plate via the spacer.

7. The connector assembly of claim 6, wherein:

the first end of the drive nut defines a threaded bore, the second end of the mandrel comprises an external threaded surface that is threaded into the threaded bore defined by the first end of the drive nut, and the second end the collet reacts against a first side of the mandrel retainer and the first end of the drive nut reacts against a second side of mandrel retainer to exert the preload force.

8. The connector assembly of claim 1, wherein:

the housing comprises a first housing part and a second housing part, the first housing part is disposed on the second coupler plate, an end of the first housing part is connected to an end of the second housing part, and the mandrel retainer is disposed between the first housing part and the second housing part.

9. The connector assembly of claim 1, wherein:

the mandrel comprises a first mandrel part and a second mandrel part, the second mandrel part is threadingly connected to the first mandrel part, the second mandrel part defines a bore therethrough, the second end of the mandrel is coupled to the first end of the drive nut, the drive nut defines a bore therethrough; and the second end of the first mandrel part defines a bore at least partially therethrough that is configured to receive an override tool through the bores defined by the drive nut and the second mandrel part.

10. The connector assembly of claim 1, further comprising:

an alignment guide disposed on the second side of the first coupler plate that defines a frusto-conical inner surface; and an alignment guide disposed on the first side of the second coupler plate that defines a frusto-conical outer surface configured to engage with the frusto-conical inner surface defined by the alignment guide disposed on the second side of the first coupler plate.

11. The connector assembly of claim 10, further comprising a clocking guide and a clocking key, wherein:

the clocking guide is disposed on the first coupler plate toward a perimeter thereof and the clocking key is disposed on the second coupler plate toward a perimeter thereof or the clocking guide is disposed on the second coupler plate toward the perimeter thereof and the clocking key disposed on the first coupler plate toward the perimeter thereof, and the clocking key is configured to engage with the clocking guide to rotate the second connector part relative to the first connector part as the second connector part is moved toward the first connector part to align the first connector part with the second connector part.

12. The connector assembly of claim 11, further comprising a plurality of fine alignment pins, wherein:

the plurality of fine alignment pins is disposed on and extend from the second side of the first coupler plate, the second coupler plate defines a plurality of corresponding fine alignment bores, and when each fine alignment pin is at least partially disposed within a corresponding fine alignment bore, each second coupler bore is aligned with a corresponding first coupler bore.

13. A process for connecting a first connector part and a second connector part of a connector assembly to one another, comprising:

obtaining the connector assembly, wherein:

the first connector part comprises:

a first coupler plate having a first side and a second side, wherein:

the first coupler plate defines a plurality of first coupler bores therethrough, each first coupler bore is configured to receive a coupler first part, and a collet housing extends from the second side of the first coupler plate and defines a bore having an inner surface at least partially therethrough and an inner groove about at least a portion of the inner surface of the bore, the second connector part comprises:

a second coupler plate having a first side and a second side, wherein:

the second coupler plate defines a plurality of second coupler bores and a collet housing receiving bore therethrough, and each second coupler bore is configured to receive a coupler second part;

a housing having a first end and a second end, wherein:

the housing defines a bore therethrough, the first end of the housing is secured to the second side of the second coupler plate, and the housing comprises a mandrel retainer;

a mandrel having a first end and a second end, wherein the mandrel defines a first surface toward the first end thereof that extends radially outward from at least a portion of the mandrel;

a collet having a first end and a second end, wherein:

a plurality of fingers is disposed toward or at the first end of the collet, the collet defines a bore therethrough, the mandrel is at least partially disposed within the bore defined by the collet, each finger comprises a shoulder disposed on an external surface thereof, and the shoulder of each finger is configured to be at least partially disposed within the inner groove defined by the collet housing; and a drive nut comprising a first end and a second end at least partially disposed within the housing, wherein:

the mandrel is movable relative to the collet along a longitudinal axis of the connector assembly, the mandrel is rotationally restrained about the longitudinal axis of the connector assembly by the mandrel retainer, the second end of the mandrel is coupled to the first end of the drive nut, and at least a portion of the mandrel, the collet, the mandrel retainer, and at least a portion of the drive nut are disposed within the bore defined by the housing;

positioning the first connector part and the second connector part at a connectable position with respect to one another; and radially displacing the plurality of fingers to position the shoulder of each finger at least partially within the inner groove defined by the collet housing.

14. The process of claim 13, wherein the first surface of the mandrel is at least partially disposed within the bore defined by the collet by rotating the drive nut about the longitudinal axis of the connector assembly.

15. The process of claim 14, wherein:

the connector assembly comprises a coupler first part disposed within one of the first coupler bores and a coupler second part disposed within one of the second coupler bores, the coupler first part is a fluid coupler first part and the coupler second part is a fluid coupler second part, and when the first connector part and the second connector part are connected to one another, the fluid coupler first part and the fluid coupler second part are fluidly coupled to one another.

16. The process of claim 15, wherein, when the first connector part and the second connector part are connected to one another, the connector assembly reacts a separation force from an internal fluid pressure of the fluid coupler first part and the fluid coupler second part.

17. The process of claim 16, wherein:

the connector assembly further comprises a spacer configured to maintain a separation distance between the first coupler plate and the second coupler plate when the first connector part and the second connector part are connected to one another, the inner groove defined by the collet housing is defined by a first shoulder, an internal cylindrical surface and a second shoulder, the mandrel comprises a flange disposed toward the first end thereof, and radially displacing the plurality of fingers comprises rotating the drive nut relative to the housing such that the flange of the mandrel abuts against the first end of the collet and the shoulder of each finger of the collet abuts against the second shoulder of the collet housing to exert a preload force between the fluid coupler first part and the fluid coupler second part, or between the first coupler plate and the second coupler plate via the spacer.

18. The process of claim 17, wherein:

the first end of the drive nut defines a threaded bore, the second end of the mandrel comprises an external threaded surface that is threaded into the threaded bore defined by the first end of the drive nut, and the second end the collet reacts against a first side of the mandrel retainer and the first end of the drive nut reacts against a second side of the mandrel retainer to exert the preload force.

19. The process of claim 15, wherein the connector assembly further comprises an alignment guide disposed on the second side of the first coupler plate and an alignment guide disposed on the first side of the second coupler plate, the first alignment guide comprises a frusto-conical inner surface and the second alignment guide comprises a frusto-conical exterior surface configured to engage with the frusto-conical inner surface of the first alignment guide, the process further comprising disposing at least a portion of the second coupler plate within the first alignment guide disposed on the first coupler plate.

20. A process for disconnecting a first connector part and a second connector part of a connector assembly from one another, comprising:

obtaining an override tool and the connector assembly, wherein:

the first connector part comprises:

a first coupler plate having a first side and a second side, wherein:

the first coupler plate defines a plurality of first coupler bores therethrough, each first coupler bore is configured to receive a coupler first part, and a collet housing that extends from the second side of the first coupler plate and defines a bore having an inner surface at least partially therethrough and an inner groove about at least a portion of the inner surface of the bore;

the second connector part comprises:

a second coupler plate having a first side and a second side, wherein:

the second coupler plate defines a plurality of second coupler bores and a collet housing receiving bore therethrough, and each second coupler bore is configured to receive a coupler second part;

a housing having a first end and a second end, wherein:

the housing defines a bore therethrough, the first end of the housing is secured to the second side of the second coupler plate, and the housing comprises a mandrel retainer;

a mandrel comprising a first mandrel part and a second mandrel part, wherein:

a first end of the second mandrel part is threadingly connected to a second end of the first mandrel part, the second mandrel part defines a bore therethrough, the first mandrel part defines a first surface toward a first end thereof that extends radially outward from at least a portion of the first mandrel part, and the second end of the first mandrel part defines a bore at least partially therethrough that is configured to receive an override tool through the bore defined by the second mandrel part;

a collet having a first end and a second end, wherein:

a plurality of fingers is disposed toward or at the first end of the collet, the collet defines a bore therethrough, the mandrel is at least partially disposed within the bore defined by the collet, each finger comprises a shoulder disposed on an external surface thereof, and the shoulder of each finger is at least partially disposed within the inner groove defined by the collet housing; and a drive nut comprising a first end and a second end at least partially disposed within the housing, wherein:

the drive nut defines a bore therethrough, the mandrel is movable relative to the collet along a longitudinal axis of the connector assembly, the mandrel is rotationally restrained about the longitudinal axis of the connector assembly by the mandrel retainer, a second end of the second mandrel part is threadingly coupled to the first end of the drive nut, and at least a portion of the mandrel, the collet, the mandrel retainer and at least a portion of the drive nut are disposed within the bore defined by the housing;

inserting an end of the override tool through the bore defined by the drive nut, the bore defined by the second mandrel part, and into the bore defined by the second end of the first mandrel part; and rotating the first mandrel part relative to the second mandrel part by rotating the override tool to disconnect the first connector part from the second connector part.

* * * * *